US011052537B2

(12) United States Patent
Kawanishi et al.

(10) Patent No.: US 11,052,537 B2
(45) Date of Patent: Jul. 6, 2021

(54) ROBOT OPERATION EVALUATION DEVICE, ROBOT OPERATION EVALUATING METHOD, AND ROBOT SYSTEM

(71) Applicant: Mitsubishi Electric Corporation, Chiyoda-ku (JP)

(72) Inventors: Ryosuke Kawanishi, Tokyo (JP); Yukiyasu Domae, Tokyo (JP); Toshiyuki Hatta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 279 days.

(21) Appl. No.: 16/095,455

(22) PCT Filed: Apr. 5, 2017

(86) PCT No.: PCT/JP2017/014216
§ 371 (c)(1),
(2) Date: Oct. 22, 2018

(87) PCT Pub. No.: WO2017/199619
PCT Pub. Date: Nov. 23, 2017

(65) Prior Publication Data
US 2019/0126475 A1 May 2, 2019

(30) Foreign Application Priority Data
May 16, 2016 (JP) .............................. JP2016-097917

(51) Int. Cl.
*B25J 9/16* (2006.01)
*B25J 19/06* (2006.01)

(52) U.S. Cl.
CPC ........... *B25J 9/1633* (2013.01); *B25J 9/1623* (2013.01); *B25J 9/1666* (2013.01); *B25J 9/1692* (2013.01); *B25J 19/06* (2013.01)

(58) Field of Classification Search
CPC ...... B25J 9/1633; B25J 9/1623; B25J 9/1666; B25J 9/1692; B25J 19/06
See application file for complete search history.

(56) References Cited

U.S. PATENT DOCUMENTS

2002/0169522 A1\* 11/2002 Kanno ............... G05B 19/4061
700/245
2010/0217528 A1\* 8/2010 Sato ..................... G05D 1/0214
701/301
(Continued)

FOREIGN PATENT DOCUMENTS

CN 102448681 A 5/2012
CN 103894807 A 7/2014
(Continued)

OTHER PUBLICATIONS

International Search Report dated Jul. 11, 2017 in PCT/JP2017/014216 filed on Apr. 5, 2017.
(Continued)

*Primary Examiner* — Khoi H Tran
*Assistant Examiner* — Nih Q Bui
(74) *Attorney, Agent, or Firm* — Xsensus LLP

(57) ABSTRACT

A robot operation evaluation device includes: an operational state calculator for calculating an operational state of an evaluation region that is a movable region of a robot, based on an operational state of the robot; a shape-feature quantity calculator for calculating a shape-feature quantity depending on an operation direction of the evaluation region corresponding to the operational state calculated; and an evaluation value calculator for calculating an evaluation value representing a risk degree of the operational state of the evaluation region with respect to the operation direction, based on the shape-feature quantity.

20 Claims, 20 Drawing Sheets

(56) References Cited

U.S. PATENT DOCUMENTS

| | | | |
|---|---|---|---|
| 2012/0043831 A1 | 2/2012 | Sakakibara et al. | |
| 2012/0265342 A1 | 10/2012 | Kumiya et al. | |
| 2016/0075023 A1* | 3/2016 | Sisbot | G01S 19/14 |
| | | | 700/255 |

FOREIGN PATENT DOCUMENTS

| | | |
|---|---|---|
| CN | 105291115 A | 2/2016 |
| JP | 7-241790 A | 9/1995 |
| JP | 2009-274148 A | 11/2009 |
| JP | 2012-40626 A | 3/2012 |
| JP | 2012-223845 A | 11/2012 |
| JP | 5668770 B2 | 2/2015 |

OTHER PUBLICATIONS

Chinese Office Action dated Jan. 29, 2021, in corresponding Chinese Patent Application No. 2017800287817.

* cited by examiner

FIG. 2
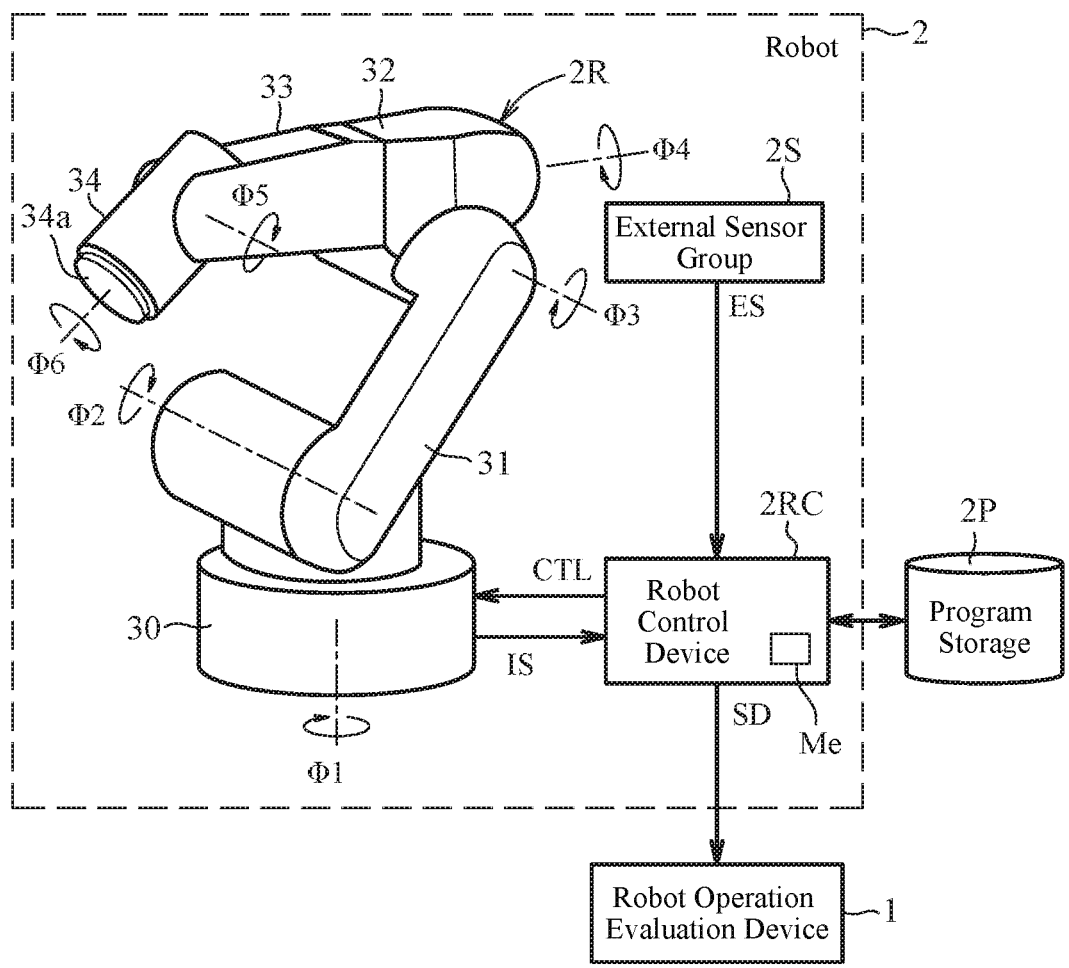
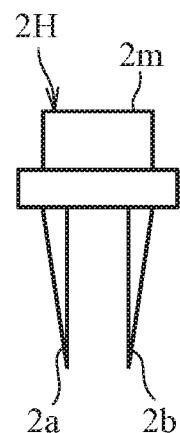
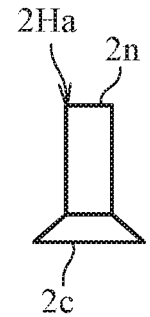
FIG. 3A    FIG. 3B

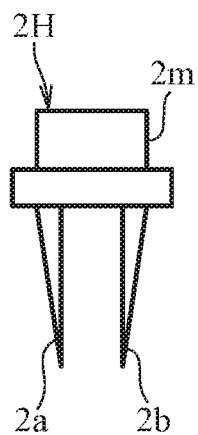
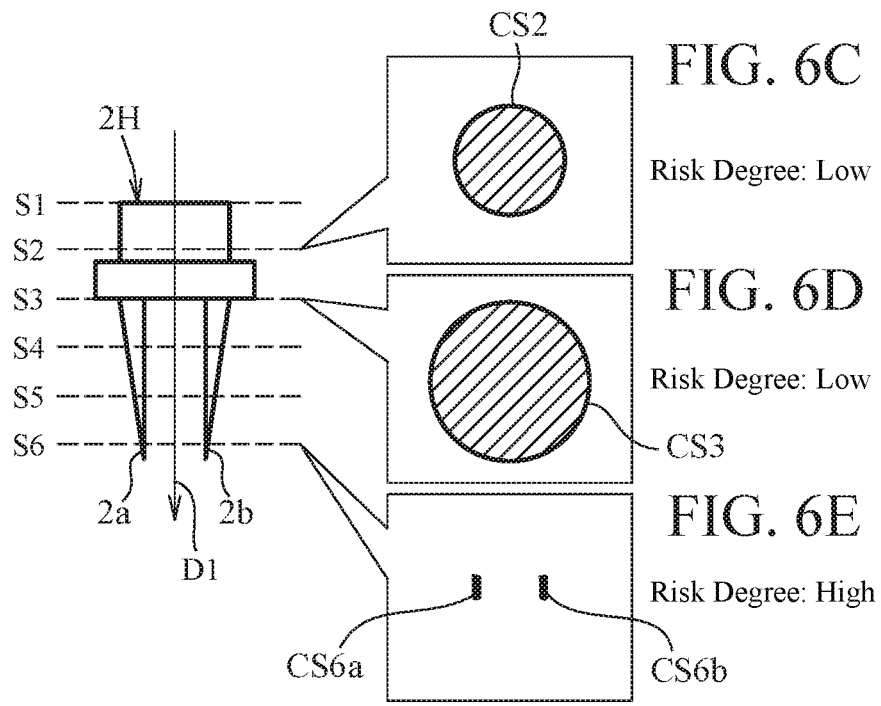

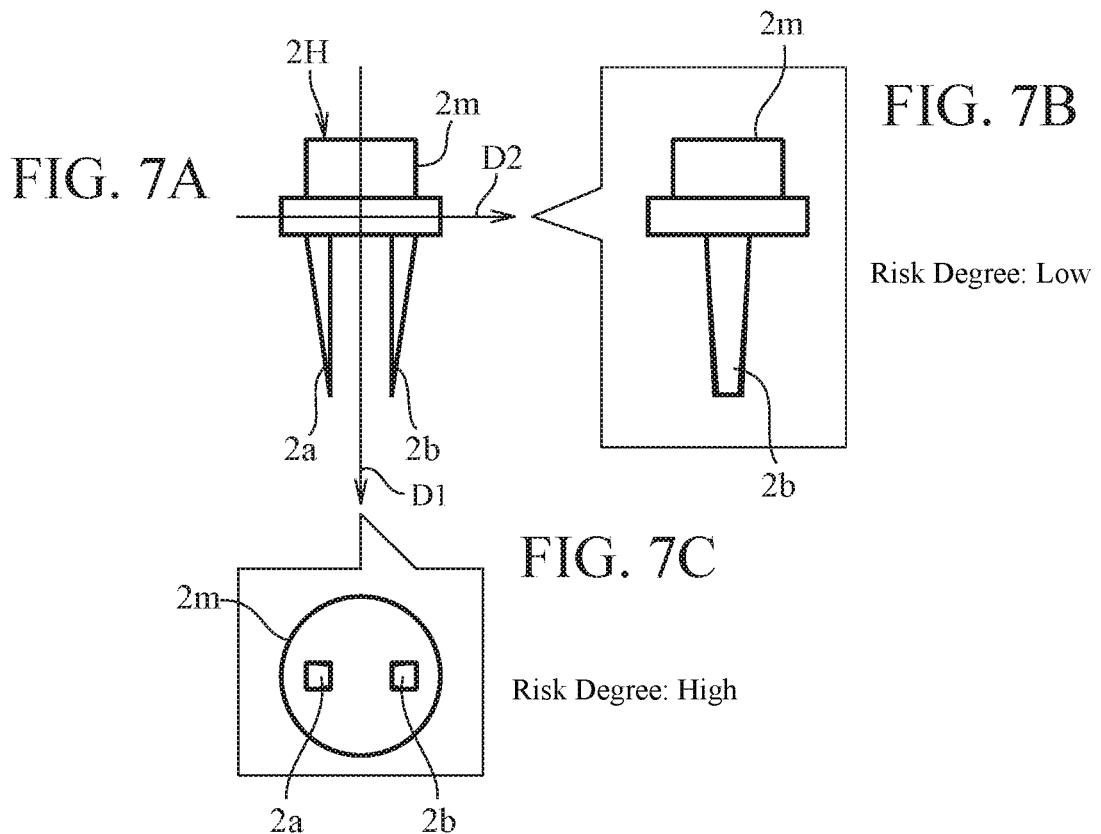
FIG. 7A   FIG. 7B   Risk Degree: Low
FIG. 7C   Risk Degree: High
FIG. 8
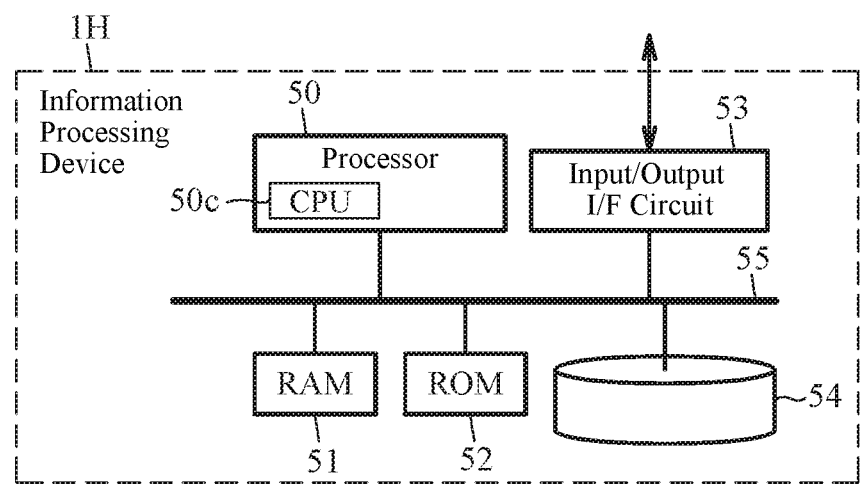

ROBOT OPERATION EVALUATION DEVICE, ROBOT OPERATION EVALUATING METHOD, AND ROBOT SYSTEM

TECHNICAL FIELD

The present invention relates to an information processing technique for evaluating an operational state of a robot, and more particularly to an information processing technique for evaluating safety or risk of an operational state of a robot.

BACKGROUND ART

In recent years, various types of robots are spreading, such as industrial robots, medical robots, and life support robots. If a living thing such as a human or an animal comes into contact with a robot within an operation range of the robot, an accident may occur. In order to prevent such an accident, a technique is demanded for avoiding that a living thing receives excessive force from the robot when the robot (in particular, industrial robot) comes into contact with the living thing. For example, Patent Literature 1 (Japanese Patent Application Publication No. 2012-40626) discloses a robot system capable of avoiding that a human receives excessive force even in an environment where contact can occur between a human and a robot.

The robot system of Patent Literature 1 includes a force sensor attached to a part of the robot, a control device for controlling operation of the robot depending on a detection value of the force sensor, and a safety fence (limiting part) for limiting a work area of the human. In the robot system, when the detection value of the force sensor exceeds a threshold value when a human comes into contact with the robot, the control device stops the operation of the robot or causes the robot to operate so that the detection value of the force sensor becomes small. In addition, the safety fence prevents contact with a robot part that may give a particularly excessive force when coming into contact with a human, among a plurality of robot parts.

CITATION LIST

Patent Literature

Patent Literature 1: Japanese Patent Application Publication No. JP 2012-40626 A (for example, paragraphs [0036] to [0039])

SUMMARY OF INVENTION

Technical Problem

When a movable region of a robot comes in contact with an object such as a human, magnitude of physical influence given to the object by the movable region can vary depending on a moving direction of the movable region of the robot and a shape of the movable region as viewed from the moving direction. For example, when the tip portion of the movable region of the robot has a thin rod shape, the magnitude of the physical influence given to the object by the movable region is quite different between when the movable region moves in a longitudinal direction of the tip portion and gives a load to a human and when the movable region moves in a direction perpendicular to the longitudinal direction and gives a load to a human.

In the robot system of Patent Literature 1, the moving direction of the movable region of the robot and the shape of the movable region as viewed from the moving direction are not considered. For this reason, regardless of difference of the magnitude of the physical influence given to an object such as a human, it is necessary to take an excessive safety measure in accordance with a situation where the physical influence given to the object is the greatest. Excessive safety measures include, for example, an increase in the number of installed force sensors, an increase in the height of the safety fence, and an excessive limitation on a movable range of the robot. However, such a safety measure has the problem that an increase in cost or performance limitation of the robot occurs.

In view of the foregoing, an object of the present invention is to provide a robot operation evaluation device, a robot operation evaluating method, and a robot system capable of implementing securing of safety of a system for operating a robot without requiring an excessive safety measure.

Solution to Problem

In accordance with an aspect of the present invention, there is provided a robot operation evaluation device which includes: an operational state calculator to calculate an operational state of an evaluation region that is a movable region of a robot, on the basis of an operational state of the robot; a shape-feature quantity calculator to calculate one or more shape-feature quantities indicative of a feature of a shape of the evaluation region with respect to an operation direction of the evaluation region, the operation direction corresponding to the calculated operational state; and an evaluation value calculator to calculate an evaluation value representing a risk degree of the operational state of the evaluation region with respect to the operation direction, on the basis of the one or more shape-feature quantities.

Advantageous Effects of Invention

In accordance with the present invention, it is possible to calculate the evaluation value representing the risk degree depending on the shape and the operation direction of the evaluation region, on the basis of the shape-feature quantity calculated with respect to the operation direction of the evaluation region of the robot. Therefore, it is possible to implement securing of the safety of the system for operating the robot without requiring an excessive safety measure.

BRIEF DESCRIPTION OF DRAWINGS

FIG. 2 is a diagram illustrating a schematic configuration of a robot according to the first embodiment.

FIGS. 3A and 3B are each a diagram illustrating an example of a robot hand.

FIG. 6A is a front view illustrating an example of a robot hand, and FIGS. 6B to 6E are diagrams for explaining a method of calculating a shape-feature quantity depending on an operation direction of the robot hand.

FIGS. 7A to 7C are diagrams for explaining another method of calculating the shape-feature quantity.

FIG. 8 is a block diagram illustrating a schematic configuration of an information processing device that is a hardware configuration example of the robot operation evaluation device of the first embodiment.

DESCRIPTION OF EMBODIMENTS

Figure 1:
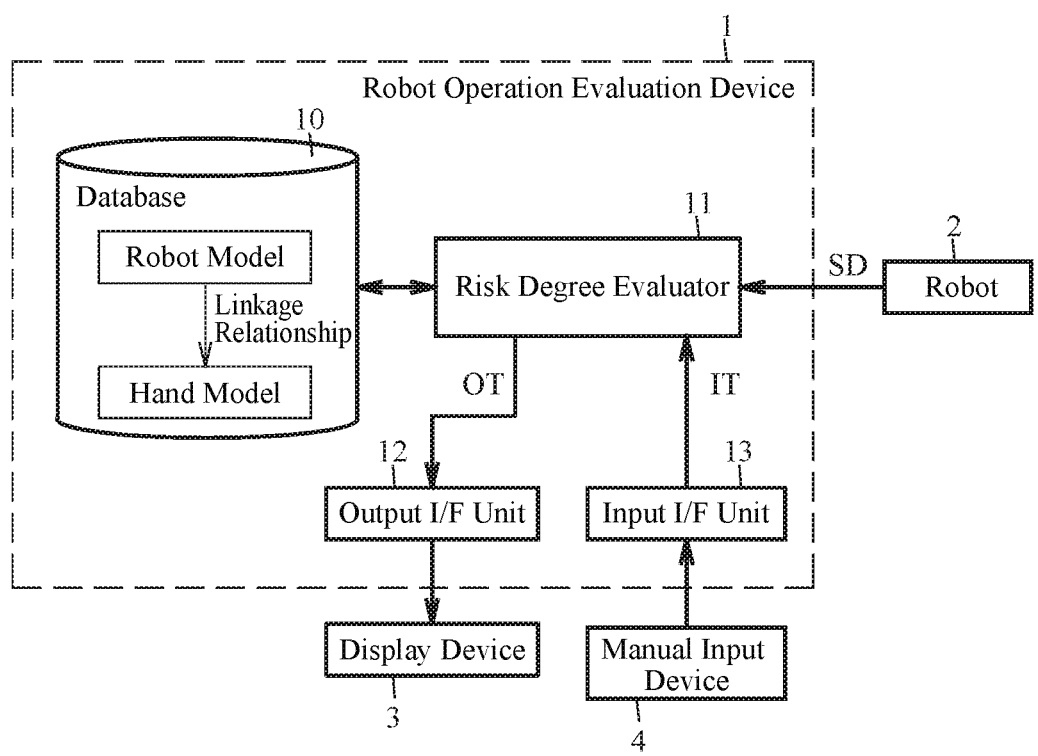
FIG. 1 is a block diagram illustrating a schematic configuration of a robot operation evaluation device of a first embodiment according to the present invention.

Hereinafter, various embodiments according to the present invention will be described in detail with reference to the drawings. Note that, constituent elements denoted by the same reference numerals throughout the drawings have the same configuration and the same function.

First Embodiment

FIG. 1 is a block diagram illustrating a schematic configuration of a robot operation evaluation device 1 of a first embodiment according to the present invention. As illustrated in FIG. 1, the robot operation evaluation device 1 includes: a database 10 storing a robot model modeling a robot 2 in a real space and a hand model (a movable region model) modeling a robot hand that is a movable region of the robot 2; a risk degree evaluator 11 for calculating an evaluation value representing a risk degree of an operational state of the robot hand by using the database 10 and outputting evaluation data OT indicating the calculation result; an output interface unit (output I/F unit) 12 for causing a display device 3 to display image information representing the evaluation data OT; and an input interface unit (input I/F unit) 13 for transmitting manual input IT from a manual input device 4 to the risk degree evaluator 11.

In the present specification, a "risk degree" represents physical influence given to an object by a movable region when the movable region such as a robot arm, a joint, or an end-effector such as a robot hand in the robot 2 comes in contact with the object such as a human or an animal, and the "evaluation value representing the risk degree" is an index representing magnitude of the physical influence. The end-effector is a tool attached to the tip of the body portion of the robot 2. As described later, when the movable region of the robot 2 comes into contact with the object, the risk degree evaluator 11 can evaluate that the greater the physical influence given to the object by the movable region, the greater the risk degree.

The robot 2 of the present embodiment includes a robot hand (hereinafter also simply referred to as "hand") for grasping an object. The robot 2 may be a robot including a robot arm having a plurality of joints such as a vertically articulated type or a horizontally articulated type, or the robot 2 may be a single axis robot that is a single axis driving device such as a linear motion stage. Each joint may include a revolute joint or a prismatic joint. When the robot 2 is a single axis robot, it can be regarded that a position on the drive axis of the movable region corresponds to an angle of a revolute joint.

FIG. 2 is a diagram schematically illustrating a configuration example of a robot system according to the first embodiment. As illustrated in FIG. 2, the robot system includes the robot operation evaluation device 1, the robot 2, and a program storage 2P for supplying an operation program to the robot 2. The robot 2 includes a main body (manipulator) 2R of a vertically articulated robot, a robot control device 2RC for controlling operation of the robot's main body 2R in accordance with the operation program acquired from the program storage 2P, and an external sensor group 2S for detecting an external state around the robot's main body 2R.

The program storage 2P includes a storage device such as a semiconductor memory that stores the operation program. The operation program includes a sequence of operation commands (code group) defining the operation of the robot's main body 2R. The robot control device 2RC temporarily stores the operation program acquired from the program storage 2P in an internal memory Me such as a semiconductor memory, and generates a control signal group CTL in accordance with the sequence of operation commands described in the operation program in the internal memory Me. The control signal group CTL is supplied to the robot's main body 2R. Note that, the robot control device 2RC may be connected to the program storage 2P via a cable, or may be connected to the program storage 2P via a communication network such as a local area network (LAN) or a wide area network (WAN).

The robot's main body 2R as illustrated in FIG. 2 includes a base region 30, first to fourth arm regions 31 to 34 including four robot arms, and a hand (not illustrated in FIG. 2). The first to fourth arm regions 31 to 34 as a whole are arranged so as to be rotatable around a rotation axis Φ1 of the base region 30. In addition, the base end portion of the first arm region 31 is arranged so as to be rotatable around a rotation axis Φ2, the base end portion of the second arm region 32 is arranged so as to be rotatable around a rotation axis Φ3 with respect to the tip portion of the first arm region 31, the base end portion of the third arm region 33 is arranged so as to be rotatable around a rotation axis Φ4 with respect to the second arm region 32, and the base end portion of the fourth arm region 34 is arranged so as to be rotatable around a rotation axis Φ5 with respect to the tip portion of the third arm region 33. In addition, the third arm region 33 is attached to the second arm region 32 so as to be extendable along the axial direction of the rotation axis Φ4 of the second arm region 32. The tip portion of the fourth arm region 34 constitutes a flange portion 34a to which the hand is attached. The flange portion 34a is attached so as to be rotatable around the rotation axis Φ6 with respect to the body of the fourth arm region 34. Therefore, the robot's main body 2R as illustrated in FIG. 2 has an articulated structure including six revolute joints and one prismatic joint.

The interior of the robot's main body 2R incorporates a drive mechanism (components such as an electromagnetic motor, a decelerator, and a bearing) for individually rotating the first to fourth arm regions 31 to 34 and flange portion 34a, a drive mechanism (components such as an electromagnetic motor, a feed screw, and a wire) for extending and contracting the third arm region 33, and a driving mechanism (components such as an electromagnetic motor and a compressor) for driving the hand attached to the flange portion 34a. The robot control device 2RC controls operation of these drive mechanisms by supplying the control signals CTL to these drive mechanisms. The interior of the robot's main body 2R incorporates an internal sensor group (not illustrated) for detecting an internal state thereof in real time. The internal state includes, for example, the rotation angle and torque of each of the first to fourth arm regions 31 to 34 and the flange portion 34a, and the amount of current flowing through the electromagnetic motor. The internal sensor group can detect the internal state in real time, and supply a state detection signal IS indicating the detected internal state to the robot control device 2RC. The robot control device 2RC can execute feedback control or feedforward control on the robot's main body 2R by using the state detection signal IS.

In addition, in the peripheral region of the robot's main body 2R, the external sensor group 2S is arranged for detecting in real time a state of the peripheral region, that is, the external state. As the external sensor group 2S, for example, it is possible to use an imaging device for outputting imaging data visually representing the external appearance of the robot's main body 2R and the peripheral space of the robot's main body 2R, a distance measuring sensor such as a laser range finder for measuring a distance between the robot's main body 2R and an object such as a human existing around the robot's main body 2R, an ultrasonic sensor, and a pressure sensor, although no limitation thereto is intended. The external sensor group 2S detects the external state, and supplies a state detection signal ES indicating the detected external state to the robot control device 2RC. The robot control device 2RC can control the robot's main body 2R by using the state detection signal ES. For example, the robot control device 2RC can analyze image data acquired from the imaging device, calculate an actual posture of the robot's main body 2R in the three-dimensional space, and control the posture of the robot's main body 2R on the basis of the calculated posture.

Note that, in the configuration example of FIG. 2, the main body 2R of the vertically articulated robot which has the six rotation axes Φ1 to Φ6 is adopted, although no limitation thereto is intended. Instead of the main body 2R of the vertically articulated robot, a main body of a horizontally articulated robot or a main body of a single-axis robot may be adopted.

The hand attached to the flange portion 34a can grasp the object by pinching or suctioning the object. FIGS. 3A and 3B are each a diagram illustrating an example of a hand. FIG. 3A is a front view of a hand 2H having a function of pinching an object, and FIG. 3B is a front view of a hand 2Ha having a function of suctioning an object. The hand 2H illustrated in FIG. 3A includes a body portion 2m attached to the flange portion 34a of the robot's main body 2R, and two claw portions 2a and 2b. The hand 2H can grasp the object by opening and closing the two claw portions in accordance with the control signal group CTL. Instead of the hand 2H, a multi-fingered hand including a plurality of joints may be used. On the other hand, the hand 2Ha illustrated in FIG. 3B includes a base end portion 2n attached to the flange portion 34a of the robot's main body 2R, and a suction pad portion 2c. The suction pad portion 2c is a suction hand for grasping the object by suctioning the object by air pressure. In the present embodiment, the hand is an evaluation region, although no limitation thereto is intended. A movable region (for example, a joint) other than the hand in the robot 2 may be used as an evaluation region.

Referring to FIG. 1, the risk degree evaluator 11 is supplied with actual operation data SD indicating an actual operational state of the robot 2, from the robot 2. The robot operation evaluation device 1 may be connected to the robot 2 via a cable, or may be connected to the robot 2 via a communication network such as a local area network (LAN) or a wide area network (WAN). In addition, instead of being supplied with the actual operation data SD from the robot 2, the risk degree evaluator 11 may be supplied with the actual operation data SD from a control device (not illustrated) for controlling operation of the robot 2.

The output I/F unit 12 is connected to the display device 3. The display device 3 is, for example, an image display device such as a liquid crystal display panel or an organic EL display panel. The output I/F unit 12 can cause the display device 3 to display the evaluation data OT generated by the risk degree evaluator 11. In addition, the manual input device 4 includes an input button and an input key that receive a manual input made by the user. The risk degree evaluator 11 can receive the manual input made by the user via the input I/F unit 13.

Figure 4:
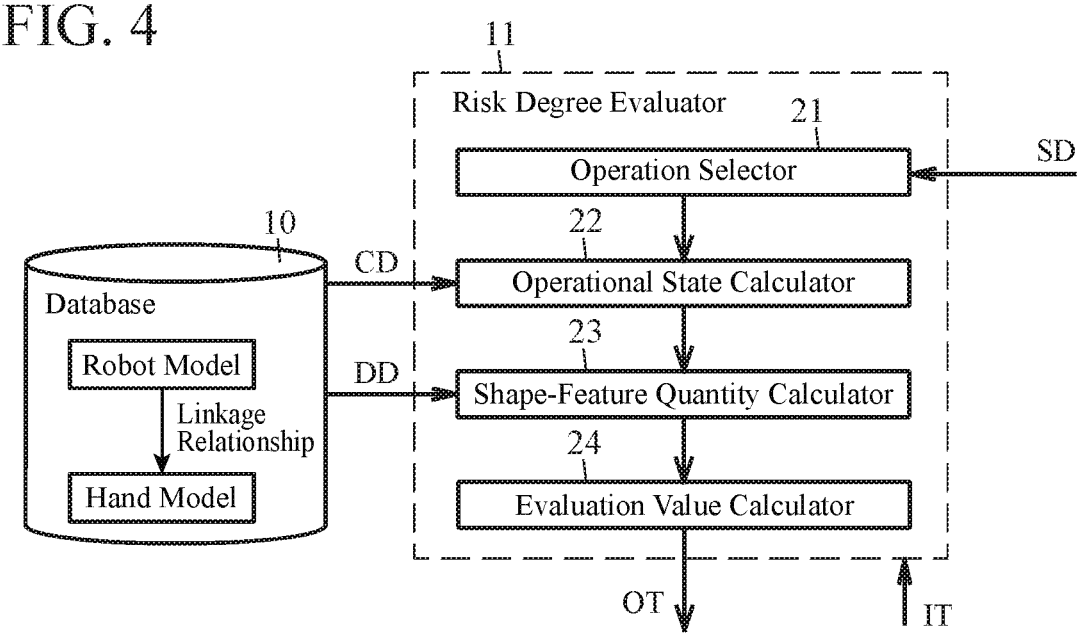
FIG. 4 is a block diagram illustrating a schematic configuration of an operation risk degree evaluator of the first embodiment.

FIG. 4 is a block diagram illustrating a schematic configuration of the risk degree evaluator 11. As illustrated in FIG. 4, the risk degree evaluator 11 includes an operation selector 21 for selecting an operational state of the robot 2 on the basis of the actual operation data SD, an operational state calculator 22 for calculating an operational state of the hand corresponding to the operational state of the robot 2 selected by the operation selector 21, a shape-feature quantity calculator 23 for calculating a shape-feature quantity indicative of a feature of a shape of the hand depending on an operation direction of the hand, and an evaluation value calculator 24 for calculating an evaluation value for evaluating a risk degree of the operational state of the hand.

The database 10 stores in advance a robot model modeling the robot 2, a hand model (a movable region model)

modeling a hand attached to the tip of the robot arm of the robot 2, and linkage relationship information indicating a linkage relationship between the robot model and the hand model. The robot model includes, for example, data indicating the three-dimensional shape of the robot's main body 2R, and data relating to a state of each region of the robot's main body 2R with respect to the posture of the robot's main body 2R. The data indicating the three-dimensional shape of the robot's main body 2R includes, for example, information indicating a position and a posture of the robot's main body 2R, and the length and thickness of each joint (revolute joint or prismatic joint) constituting the robot arm of the robot 2. The data relating to the state of each region of the robot's main body 2R includes, for example, data indicating a relational expression for calculating a rotational displacement amount (joint angle) of the revolute joint and a translational displacement amount of the prismatic joint by using the information on the position and posture of the robot's main body 2R.

On the other hand, the hand model includes a hand shape model modeling the three-dimensional shape of the hand. The linkage relationship information is a relational expression that enables mutual conversion between the coordinate system of the robot model (hereinafter also referred to as "robot coordinate system") and the coordinate system of the hand model (hereinafter also referred to as a "hand coordinate system"). Note that, the coordinate system of the robot model may be, for example, a coordinate system set with respect to the base region 30 of the robot's main body 2R, or a coordinate system set with respect to the flange portion 34a of the robot's main body 2R. As the coordinate system of the hand model, for example, a coordinate system based on 3D-computer aided design system (CAD) data representing a three-dimensional shape of the hand can be used.

Figure 5:
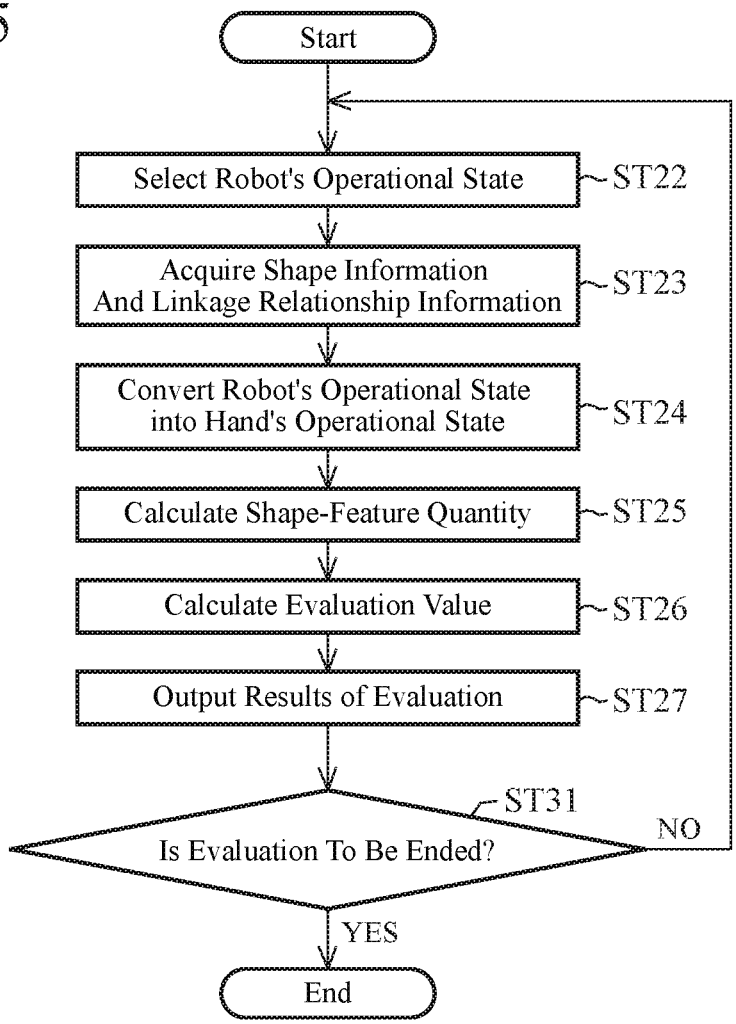
FIG. 5 is a flowchart schematically illustrating an example of a procedure of robot operation evaluation processing according to the first embodiment.

Hereinafter, operation of the robot operation evaluation device 1 will be described with reference to FIG. 5. FIG. 5 is a flowchart schematically illustrating an example of a procedure of robot operation evaluation processing according to the first embodiment.

The operation selector 21 selects the operational state of the robot 2 (hereinafter referred to as "robot's operational state") on the basis of the actual operation data SD (step ST22). Here, the robot's operational state is a state of movement of the robot's main body 2R corresponding to each operation command when each operation command for the robot's main body 2R is set as a minimum unit. The operation command for the robot's main body 2R is, for example, a command for controlling operation of each joint of the robot's main body 2R so that the position and posture of the robot's main body 2R changes from a state before movement to a state after the movement, when the state of the position and posture in the three-dimensional space of the robot's main body 2R before the movement and the state of the position and posture in the three-dimensional space of the robot's main body 2R after the movement are given. At this time, an operation command may be given for specifying the state of the position and posture in the three-dimensional space, or an operation command may be given for specifying the angle of each joint of the robot's main body 2R before and after the movement. In addition, when the hand has the function of pinching the object, the robot's operational state also includes a moving speed of the robot's main body 2R and an opening/closing state of the hand. In step ST22, one robot's operational state may be selected, or a plurality of robot's operational states may be selected. When the plurality of robot's operational states is selected, processing for calculating an evaluation value (to be described later) is executed for each of these robot's operational states, that is, for each operation command for the robot's main body 2R (step ST26).

In the present embodiment, the robot's operational state is selected on the basis of the actual operation data SD, although no limitation thereto is intended. Instead of selecting the robot's operational state on the basis of the actual operation data SD, the robot's operational state may be selected on the basis of the manual input IT made by the user, or one or more robot's operational states may be selected from among a plurality of operational states that is a template set in advance.

After step ST22, the operational state calculator 22 and the shape-feature quantity calculator 23 respectively acquire linkage relationship information CD and shape information DD indicating the shape of the hand model from the database 10 (step ST23).

Next, the operational state calculator 22 converts the robot's operational state into the operational state of the hand (hereinafter also referred to as "hand's operational state") by using the linkage relationship information CD (step ST24). The linkage relationship information CD includes, for example, a transformation matrix from the robot coordinate system to the hand coordinate system. The transformation matrix can be expressed as a matrix of four rows×four columns including information indicating rotational movement and translational movement between the robot coordinate system and the hand coordinate system. By converting the robot coordinate system into the hand coordinate system by using the transformation matrix, it is possible to obtain the hand's operational state in the hand coordinate system after the transformation.

Here, when the risk degree of the robot's operational state is evaluated with respect to the robot's operational state in the robot coordinate system, even if the hands attached to the robot's main body 2R are different from each other, the same evaluation is obtained. Since the danger at the occurrence of a collision varies even in the same robot's operational state depending on the shape of the hand, it is effective to evaluate the risk degree with respect to the hand's operational state. However, when the evaluation data OT is presented to the user, it is preferable to use the robot coordinate system as a reference. This is because if the evaluation data OT is presented to the user with respect to the hand's operational state, it is difficult to specifically know which robot's operational state is dangerous, so that it is difficult for the user to intuitively grasp the robot's operational state to be improved. Therefore, the output I/F unit 12 preferably generates image information based on the robot coordinate system and causes the display device 3 to display the information so that the evaluation data OT is associated with the robot's operational state in a form that the user can intuitively understand.

After step ST24, the shape-feature quantity calculator 23 calculates a shape-feature quantity indicative of a feature of the shape of the hand with respect to the operation direction of the hand corresponding to the robot's operational state by using the shape information DD (step ST25). Then, the evaluation value calculator 24 calculates an evaluation value representing the risk degree of the hand's operational state with respect to the operation direction on the basis of the shape-feature quantity or the combination of the shape-feature quantity and the hand's moving speed (step ST26), and outputs the evaluation data OT indicating the evaluation value to the output I/F unit 12 (step ST27).

For example, the shape-feature quantity calculator 23 can calculate the cross-sectional area or the end section area of the hand in a face (i.e., cross section or end section of the hand) perpendicular to the operation direction of the hand, as a shape-feature quantity depending on the operation direction. FIG. 6A is a front view illustrating an example of the hand 2H, and FIGS. 6B to 6E are diagrams for explaining a method of calculating a shape-feature quantity depending on an operation direction D1 of the hand 2H. As illustrated in FIG. 6A, the hand 2H includes the pair of claw portions 2a and 2b protruding from the body portion 2m. The hand 2H can grasp the object by opening and closing the claw portions 2a and 2b. As illustrated in FIG. 6B, six faces are conceivable of S1, S2, S3, S4, S5, and S6 (the face S1 is the end section of the hand 2H; the faces S2 to S6 are the cross section of the hand 2H) perpendicular to the operation direction D1. FIG. 6C illustrates a cross-sectional region CS2 of the hand 2H in the cross section S2, FIG. 6D illustrates a cross-sectional region CS3 of the hand 2H in the cross section S3, and FIG. 6E illustrates cross-sectional regions CS6a and CS6b of the hand 2H in the cross section S6. The number of independent face regions (end section regions or cross-sectional regions) is one in each of the end section S1 and the cross sections S2 and S3. On the other hand, the number of independent cross-sectional regions is two in each of the cross sections S4 to S6. Here, the independent face region (hereinafter also referred to as "segment") is a face region not connected to another face region.

The evaluation value calculator 24 includes an evaluation function giving an evaluation value depending on the shape-feature quantity and an evaluation function giving an evaluation value depending on the shape-feature quantity and the moving speed of the hand (an evaluation region). The evaluation value calculator 24 can calculate an evaluation value representing the risk degree of the operational state of the hand (an evaluation region) with respect to the operation direction of the hand by using any of these evaluation functions (step ST26).

Specifically, the evaluation function can be designed so that the evaluation value becomes higher as the cross-sectional area or the end section area is smaller, or the hand's moving speed is greater. In this case, the cross-sectional area or the end section area of the hand may be calculated as the entire area of one or more face regions in each cross section or each end section. Alternatively, the cross-sectional area or the end section area of the hand may be calculated for each independent face region (segment) in each cross section or each end section. In the present embodiment, it is assumed that an index is assigned for each segment.

In addition, as the face region of each cross section or each end section is located on a more positive side in the operation direction of the hand, there is a higher possibility that the face region first comes into contact at the time of a collision of the hand, so that it is possible to increase the evaluation value representing the risk degree. Alternatively, the evaluation value may be calculated on the basis of only the segment having the smallest area among the plural segments existing in each cross section or each end section. It is desirable to design the evaluation function in accordance with the type of the object with possibility of collision with the hand and the calculation purpose of the evaluation value.

Examples of the evaluation function includes an expression (1) below.

$$D = \frac{H_s}{\min_i\left(\min_j(S_{i,j})\right)} \quad (1)$$

Here, D is an evaluation value representing the risk degree, $H_s$ is a moving speed of the hand, $S_{i,j}$ is an area for each segment of a cross section or an end section perpendicular to the operation direction in the hand (an evaluation region), i is an index (the face number) of the cross section or the end section, and j is an index (segment number) of the segment. In addition, min{x} gives a value of the smallest x among a set {x}. Therefore, the expression (1) gives the evaluation value D on the basis of the segment having the smallest area among the segments existing in all cross sections and end sections. In addition, the evaluation value D of the expression (1) is proportional to the moving speed of the hand. In an evaluating method using the expression (1), all the hand's operational states each having a possibility of contact of the sharp claw portions 2a and 2b of the hand are regarded as high risk degrees.

In addition, instead of the expression (1), an expression of a weighted summation, an expression (2) as shown below may be used as the evaluation function.

$$D = \sum_i \frac{H_s}{\min_j(S_{i,j})} w_i \quad (2)$$

Here, $w_i$ is a weighting coefficient assigned to the i-th cross section or end section, and an expression (3) below holds.

$$\sum_i w_i = 1 \quad (3)$$

The weighting coefficient $w_i$ is set to a value that becomes a greater value as the cross section or the end section is arranged closer on the operation direction side. In the example of FIG. 6B, among the weighting coefficients $w_1$ to $w_6$ respectively corresponding to the end section S1 and the cross sections S2 to S6, the weighting coefficient $w_6$ assigned to the cross section S6 has the highest value and the weighting coefficient $w_1$ assigned to the end section S1 has the lowest value.

In addition, an evaluation function may be used that takes the moving speed of the evaluation region into consideration. Here, it is assumed that the moving speed of the j-th segment in the i-th cross section or end section of the evaluation region is represented by $v_{i,j}$ ($v_{i,j}$ is a three-dimensional vector). In addition, a monotonically increasing function is represented as $f(v_{i,j})$ that gives a value that increases as the norm (absolute value) of the moving speed $v_{i,j}$ increases. Examples of the monotonically increasing function $f(v_{i,j})$ include a monomial expression or polynomial expression having the norm of the moving speed $v_{i,j}$ as a variable, or an exponential function having the norm of the moving speed $v_{i,j}$ as a variable, although no limitation thereto is intended. Using the expression (2) and the monotonically increasing function $f(v_{i,j})$, an evaluation function can be configured defined by an expression (4A) below.

$$D = \sum_i \frac{H_s}{\min_j(S_{i,j})} w_i f(v_{i,q[i]}) \quad (4A)$$

In the above expression (4A), q[i] is an index of the segment having the smallest area among a set of the area $S_{i,j}$ of one or more segments in the i-th cross section or end section. Specifically, q[i] is given by an expression (4B) below.

$$q[i] = \arg\min_j(S_{i,j}) \quad (4B)$$

Alternatively, using the expression (1) and the function $f(v_{i,j})$, an evaluation function can be configured defined by an expression (5A) below.

$$D = \frac{H_s}{\min_i\left(\min_j(S_{i,j})\right)} f(v_{p,q}) \quad (5A)$$

In the expression (5A), p is an index of an end section or a cross section having the smallest area among a set of the area $S_{i,q[i]}$, and q is an index of a segment having the smallest area among a set of the area $S_{p,j}$ of one or more segments in the p-th cross section or end section. Specifically, p and q are given by an expression (5B) below.

$$p = \arg\min_i(S_{i,q[i]}), \; q = q[p] = q\left[\arg\min_j(S_{p,j})\right] \quad (5B)$$

Alternatively, the shape-feature quantity calculator 23 may calculate an amount indicative of a feature of a projected shape (for example, an edge or a vertex) of the hand as viewed from a direction opposite to the operation direction of the hand, as a shape-feature quantity depending on the operation direction (step ST25). Here, the projected shape is a shape obtained by projecting the hand on a projection face virtually arranged on an operation direction side of the hand from the hand as the evaluation region. This projection face is orthogonal to the operation direction of the hand. FIGS. 7A to 7C are diagrams for explaining another method of calculating the shape-feature quantity. FIG. 7A is a front view of the hand 2H, FIG. 7C is a projection view illustrating a projected shape of the hand as viewed from a direction opposite to the first operation direction D1 of the hand, and FIG. 7B is a projection view illustrating a projected shape of the hand as viewed from a direction opposite to a second operation direction D2 of the hand. The shape-feature quantity calculator 23 can extract an edge (ridgeline) or a vertex from the projected shape of the hand and use the edge or vertex for calculation of the shape-feature quantity. Here, the edge is a boundary portion where a step-like level difference is generated in the projected shape. In addition, the vertex is a portion that becomes an intersection of plural edges. In this way, the ridgeline and vertex are extracted of the hand with possibility of collision during operation of the hand. Note that, a method of detecting the edge and vertex of the hand with possibility of collision is not limited thereto. Various methods can be considered, such as a method of extracting the edge and vertex by associating the operation direction of the hand with a normal direction of a mesh constituting the hand included as information of 3D-CAD data of the hand.

In this case, the shape-feature quantity calculator 23 can calculate, as a shape-feature quantity, an angle formed between the two faces forming the edge appearing in the projected shape, or an angle formed between two faces among a plurality of faces forming the vertex appearing in the projected shape. As an evaluation function, a function can be designed that increases the evaluation value representing the risk degree as the angle becomes smaller. Alternatively, the shape-feature quantity calculator 23 may calculate, as the shape-feature quantity, the position coordinates and three-dimensional direction vector of the edge or vertex of the hand, for example. As the evaluation function giving the evaluation value, for example, a function can be designed that increases the evaluation value as an angle is smaller formed by the three-dimensional direction of the edge or vertex of the hand and the operation direction of the hand, or as the position of the edge or vertex is more positive in the operation direction of the hand. Note that, the direction vector of the vertex of the hand can be calculated as an average of vectors indicating three-dimensional directions of plural edges forming a vertex (directions along edges), for example.

Here, in the design of the evaluation function, all the edges and vertices with possibility of collision may be used, or only the edge or vertex existing on a positive side in the operation direction of the hand may be used. In addition, when the risk degree is calculated from plural edges and vertices, a weighting coefficient may be introduced so that the risk degree increases as each edge or vertex is located on a more positive side in the operation direction.

After the output of the results of the evaluation described above (step ST27 in FIG. 5), in the case where the evaluation is not to be ended (NO in step ST31), the operation selector 21 executes step ST22 on the basis of the actual operation data SD. On the other hand, in the case where the evaluation is to be ended (YES in step ST31), the risk degree evaluator 11 ends the robot operation evaluation processing described above.

In order to present the evaluation data OT to the user, the output I/F unit 12 converts the evaluation data into image information and causes the display device 3 to display the image information. Methods of generating the image information include, for example, a method of listing the evaluation values in association with the robot's operational states, or a method of displaying an operation trajectory of the robot on a simulator while changing color in accordance with the calculated evaluation value. For example, it is possible to generate image information for indication in red when the risk degree is high and in blue when the risk degree is low. The high or low in the risk degree may be determined from a preset threshold value, or may be determined by relative evaluation of the risk degree (evaluation value) calculated for each of the plurality of robot's operational states. For example, the threshold value may be set in accordance with the collision safety standard, or a value obtained experimentally or empirically may be used.

A hardware configuration of the robot operation evaluation device 1 described above can be implemented by an information processing device having a computer configuration incorporating a central processing unit (CPU), for example. Alternatively, the hardware configuration of the robot operation evaluation device 1 may be implemented by an information processing device including a large scale integrated circuit (LSI) such as a digital signal processor (DSP), an application specific integrated circuit (ASIC), or a field-programmable gate array (FPGA).

FIG. 8 is a block diagram illustrating a schematic configuration of an information processing device 1H that is a hardware configuration example of the robot operation evaluation device 1. The information processing device 1H includes a processor 50 including a CPU 50*c*, a random access memory (RAM) 51, a read only memory (ROM) 52, an input/output interface (I/F) circuit 53, and a recording medium 54. The processor 50, the RAM 51, the ROM 52, the input/output I/F circuit 53, and the recording medium 54 are connected to each other via a signal path 55 such as a bus circuit. The recording medium 54 can be used as a storage area for storing the database 10 described above. The recording medium 54 can include, for example, an HDD or a solid state drive (SSD). The processor 50 can implement a function of the operation risk degree evaluator 11 described above by reading and executing a computer program for robot evaluation processing from the ROM 52. The input/output interface circuit 53 is a circuit for implementing functions of the output I/F unit 12 and the input I/F unit 13 described above.

Figure 9:
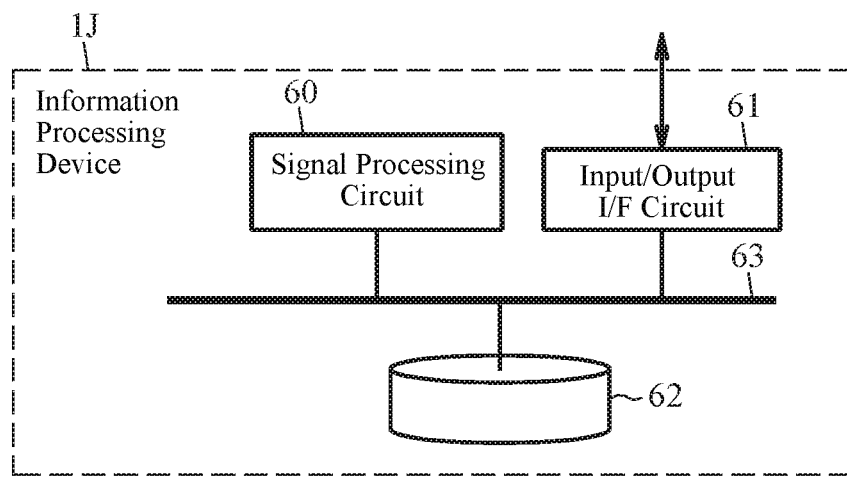
FIG. 9 is a block diagram illustrating a schematic configuration of an information processing device that is another hardware configuration example of the robot operation evaluation device of the first embodiment.

In addition, FIG. 9 is a block diagram illustrating a schematic configuration of an information processing device 1J that is another hardware configuration example of the robot operation evaluation device 1. The information processing device 1J includes a signal processing circuit 60, an input/output interface (I/F) circuit 61, and a recording medium 62. The signal processing circuit 60, the input/output I/F circuit 61, and the recording medium 62 are connected to each other via a signal path 63 such as a bus circuit. The recording medium 62 can be used as a storage area for storing the database 10 described above. The recording medium 62 can include, for example, an HDD or an SSD. The signal processing circuit 60 can implement a function of the operation risk degree evaluator 11 described above. The input/output interface circuit 61 is a circuit for implementing functions of the output I/F unit 12 and the input I/F unit 13 described above.

As described above, the robot operation evaluation device 1 of the first embodiment can calculate the shape-feature quantities indicative of features of the shape of the hand with respect to the operation direction of the hand, and on the basis of the shape-feature quantity, calculate the evaluation value representing the risk degree depending on the shape and the operation direction of the hand. Therefore, since it is possible to grasp the risk degree accompanying the operation of the robot 2 for each robot's operational state, it is easy to determine installation positions and required specifications of a safety fence and an entering detection sensor, so that an efficient system can be constructed so as not to have an excessive safety measure. In addition, it becomes easy to identify and modify the robot's operational state with high risk degree. Therefore, if the robot operation evaluation device 1 of the present embodiment is used, it is possible to implement securing of the safety of the system for operating the robot 2 without requiring an excessive safety measure.

Here, in the safety measure of the conventional robot system, a moving direction of the movable region of the robot and a shape of the movable region as viewed from the moving direction have not been considered. For this reason, in order to secure safety, it has been necessary to take an excessive safety measure corresponding to the most dangerous situation. As an example of the most dangerous situation, a situation is conceivable that when a tip portion of the robot hand has a sharp shape, the tip portion collides straight with a human. In such a situation, there is a possibility that even when the tip portion collides with a human with a weak force, it may give a large physical shock to the human. In order to avoid such a physical shock, in the conventional robot system, since the force sensor limits the operation of the robot only by detecting such a weak force, there has been a possibility that inefficient control is executed for the robot's main body. On the other hand, if the robot operation evaluation device 1 of the present embodiment is used, it becomes possible to execute efficient control for the robot's main body 2 while implementing securing of the safety of the system for operating the robot 2 without requiring an excessive safety measure.

Second Embodiment

Figure 10:
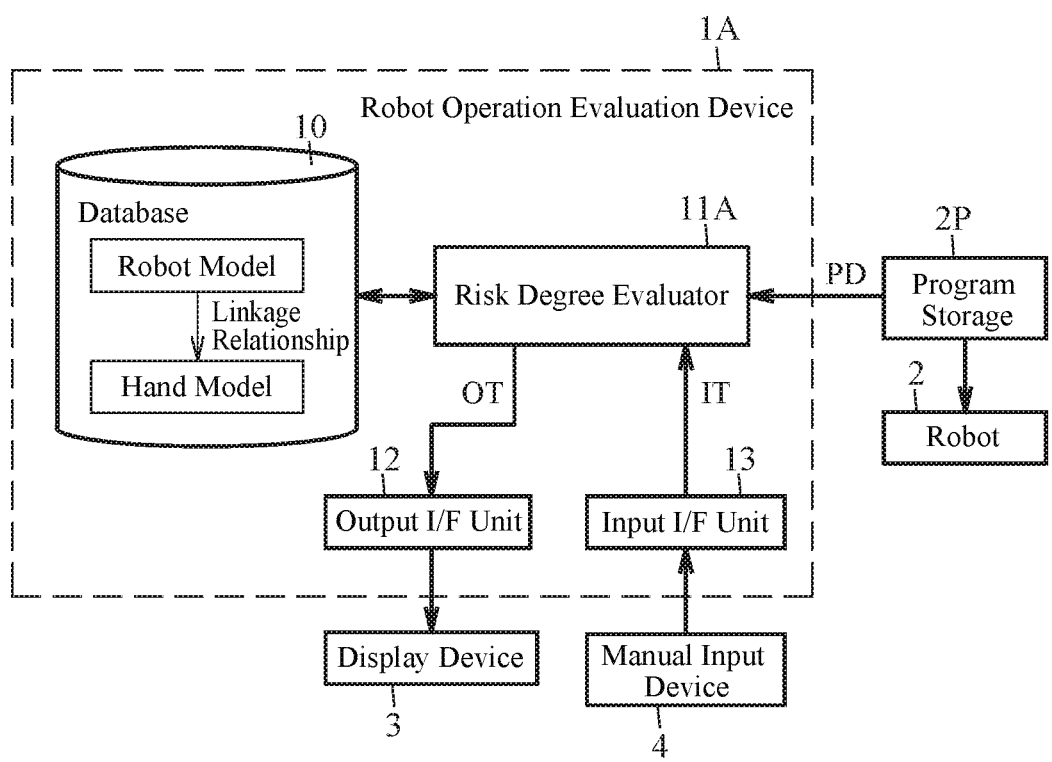
FIG. 10 is a block diagram illustrating a schematic configuration of a robot operation evaluation device of a second embodiment according to the present invention.

Next, a second embodiment according to the present invention will be described. FIG. 10 is a block diagram illustrating a schematic configuration of a robot operation evaluation device 1A of the second embodiment according to the present invention. As illustrated in FIG. 10, the robot operation evaluation device 1A includes a database 10, a risk degree evaluator 11A for evaluating a risk degree of an operational state of a robot hand by using the database 10 and outputting evaluation data OT indicating the results of the evaluation, an output I/F unit 12, and an input I/F unit 13.

Figure 11:
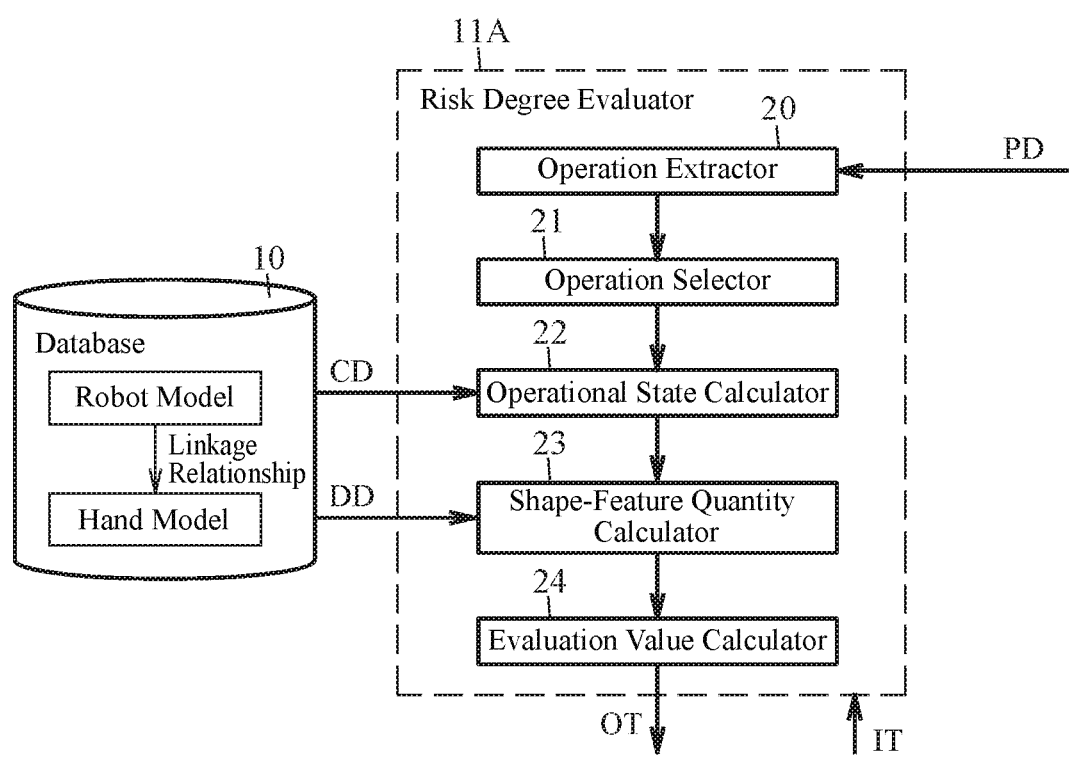
FIG. 11 is a block diagram illustrating a schematic configuration of a risk degree evaluator of the second embodiment.

FIG. 11 is a block diagram illustrating a schematic configuration of the risk degree evaluator 11A of the second embodiment. As illustrated in FIG. 11, the risk degree evaluator 11A includes: an operation extractor 20 for receiving an operation program PD defining a sequence of operations of a robot's main body 2R, and extracting a plurality of operational states of the robot 2 from the operation program PD; an operation selector 21 for selecting an operational state of the robot 2 from the plurality of operational states; an operational state calculator 22 for calculating an operational state of the hand corresponding to the operational state of the robot 2 selected by the operation selector 21; a shape-feature quantity calculator 23 for calculating a shape-feature quantity depending on an operation direction of the hand; and an evaluation value calculator 24 for calculating an evaluation value on the basis of the shape-feature quantity.

The operation program PD is supplied from a program storage 2P to the risk degree evaluator 11A. The risk degree evaluator 11A may be connected to the program storage 2P via a cable, or may be connected to the program storage 2P via a communication network such as a LAN or a WAN.

A configuration of the robot operation evaluation device 1A of the present embodiment is the same as the configuration of the robot operation evaluation device 1 of the first embodiment, except that the risk degree evaluator 11A in FIG. 11 includes the operation extractor 20, and operation data indicating the operational state of the robot 2 is supplied to the operation selector 21 from the operation extractor 20.

Figure 12:
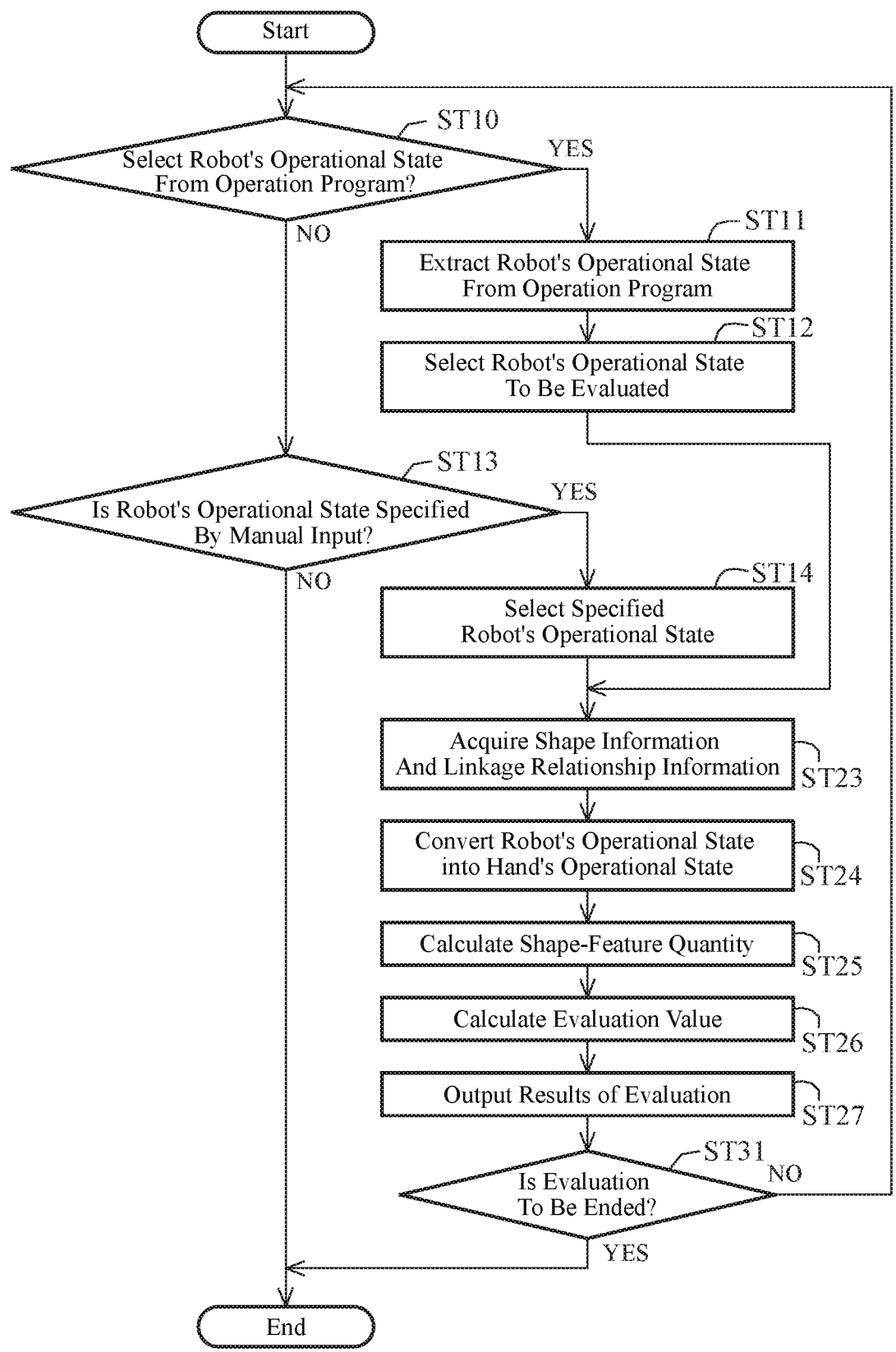
FIG. 12 is a flowchart schematically illustrating an example of a procedure of robot operation evaluation processing according to the second embodiment.

Hereinafter, operation of the robot operation evaluation device 1A will be described with reference to FIG. 12. FIG. 12 is a flowchart schematically illustrating an example of a procedure of robot operation evaluation processing according to the second embodiment.

Referring to FIG. 12, the operation extractor 20 determines whether or not to select a robot's operational state from the operation program PD in accordance with instruction contents of a manual input IT (step ST10). That is, when there is an instruction not to select the robot's operational state from the operation program PD, the operation extractor 20 determines not to select the robot's operational state from the operation program PD (NO in step ST10). Next, when a robot's operational state is not specified by the manual input IT (NO in step ST13), the robot operation evaluation processing is ended. When a robot's operational state is specified by a manual input IT (YES in step ST13), the operation extractor 20 gives the specified robot's operational state to the operation selector 21, so that the operation selector 21 selects the specified robot's operational state (step ST14). After that, the processing from step ST23 is executed.

On the other hand, when the robot's operational state is selected from the operation program PD (YES in step ST10), the operation extractor 20 extracts a plurality of operational states of the robot 2 from the operation program PD (step ST11). Specifically, the operation extractor 20 detects a portion (code) corresponding to an operation command for the robot's main body 2R from the input operation program PD, and extracts a robot's operational state including a moving speed. Next, the operation selector 21 selects at least one robot's operational state from the plurality of operational states (step ST12). After that, the processing from step ST23 is executed.

After the output of the results of the evaluation (step ST27 in FIG. 12), in the case where the evaluation is not to be ended (NO in step ST31), the operation extractor 20 executes the determination processing in step ST10. On the other hand, in the case where the evaluation is to be ended (YES in step ST31), the risk degree evaluator 11 ends the robot operation evaluation processing described above.

As described above, the robot operation evaluation device 1A of the second embodiment can evaluate the risk degree of the operational state of the hand corresponding to the robot's operational state defined by the operation program PD. Therefore, it is possible to comprehensively evaluate the risk degree caused by the sequence of operations of the robot 2 described in the operation program PD. In addition, when actually operating the robot 2, it is possible to know in advance which operational state is dangerous. Further, it is also possible to omit user's labor of setting a plurality of robot's operational states to be evaluated.

When a plurality of completely identical operational states is defined in the operation program PD, it is possible to reduce calculation cost of the evaluation by selecting and evaluating only one of the operational states.

Third Embodiment

Figure 13:
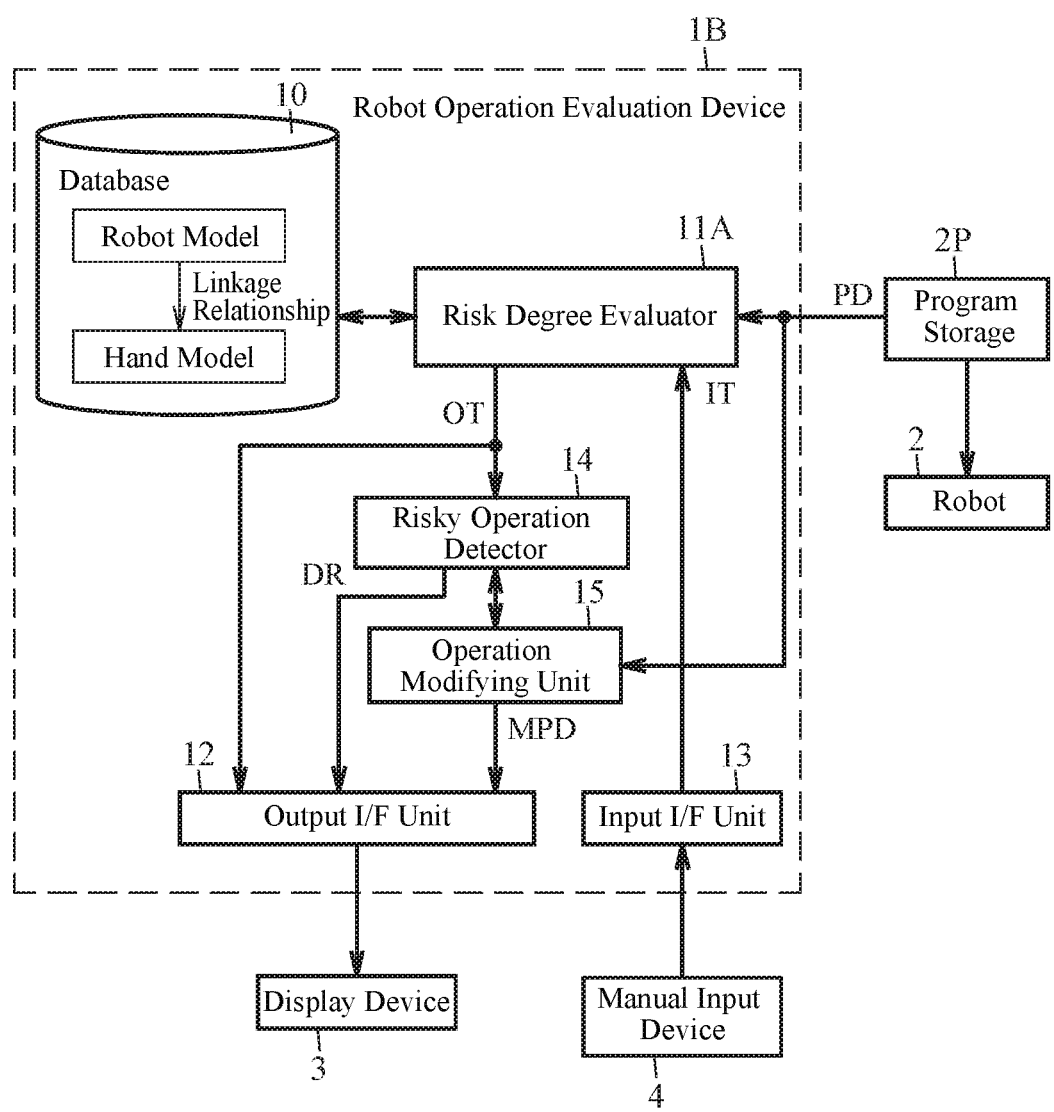
FIG. 13 is a block diagram illustrating a schematic configuration of a robot operation evaluation device of a third embodiment according to the present invention.

Next, a third embodiment according to the present invention will be described. FIG. 13 is a block diagram illustrating a schematic configuration of a robot operation evaluation device 1B of the third embodiment according to the present invention. As illustrated in FIG. 13, the robot operation evaluation device 1B includes a database 10, a risk degree evaluator 11A, an output I/F unit 12, and an input I/F unit 13, similarly to the robot operation evaluation device 1A of the second embodiment, and further includes a risky operation detector 14 and an operation modifying unit 15.

The risky operation detector 14 determines whether or not an evaluation value of an operational state of a hand (an evaluation region) exceeds a threshold value, and outputs determination data DR indicating a determination result to the output I/F unit 12 and the operation modifying unit 15. The output I/F unit 12 can cause the display device 3 to display the determination data DR. In addition, the operation modifying unit 15 can generate a modified operation program MPD by modifying an operational state to cause the evaluation value to be reduced, the operational state being determined by the risky operation detector 14 that the evaluation value exceeds the threshold value (hereinafter also referred to as "risky operational state").

Here, as the threshold value, a threshold value set in advance by a manual input IT made by the user may be used. Alternatively, the threshold value may be determined by relative evaluation of a risk degree of a plurality of robot's operational states defined in an operation program PD. In addition, as the threshold value, for example, a value set in accordance with the collision safety standard may be used, or a value obtained experimentally or empirically may be used. When the threshold value is determined by the relative evaluation, a robot's operational state may be selected having the highest risk degree among the plurality of robot's operational states defined in the operation program PD, or a specified number of robot's operational states may be selected in the descending order of the risk degree.

Figure 14:
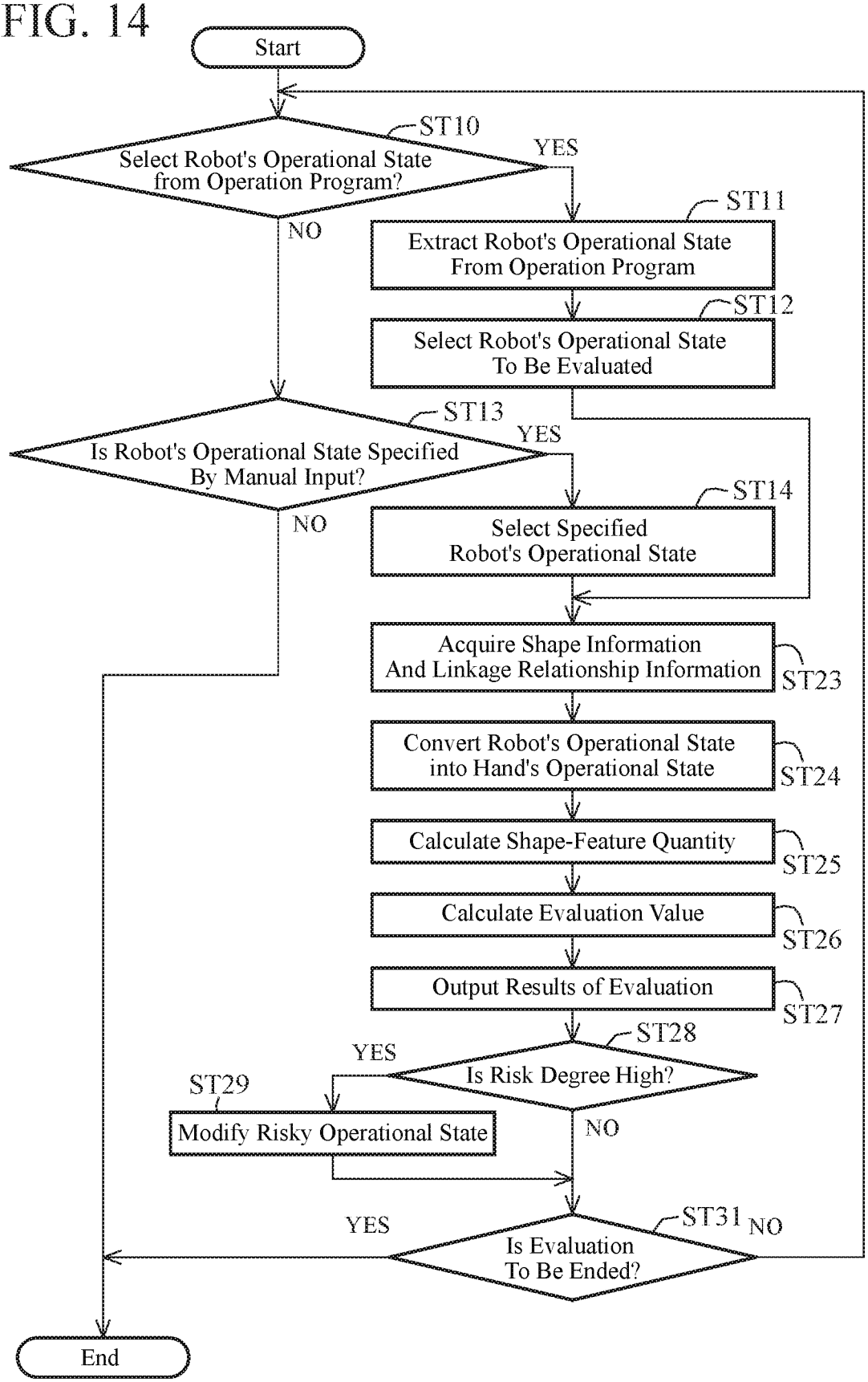
FIG. 14 is a flowchart schematically illustrating an example of a procedure of robot operation evaluation processing according to the third embodiment.

Hereinafter, operation of the robot operation evaluation device 1B will be described with reference to FIG. 14. FIG. 14 is a flowchart schematically illustrating an example of a procedure of robot operation evaluation processing according to the third embodiment.

Referring to FIG. 14, similarly to the case of the second embodiment, the risk degree evaluator 11A executes steps ST10 to ST14 and ST23 to ST27. When evaluation data OT indicating the results of the evaluation is output (step ST27), the risky operation detector 14 determines whether or not the risk degree is high, that is, whether or not the evaluation value indicated by the evaluation data OT exceeds the threshold value prepared in advance (step ST28).

Here, in the determination whether or not the risk degree is high (step ST28), a constraint condition may be appropriately given. An example of the constraint condition is a condition that a hand's operational state corresponding to a robot's operational state in a specific direction or region is not determined as a risky operational state. For example, it may be unnecessary to evaluate the risk degree in an area where it is decided to install a safety fence or in a specific direction without physical danger of collision. Another condition is that a hand's operational state corresponding to a robot's operational state using feedback of a detection result by a sensor such as a force sensor or a visual sensor is not determined as a risky operational state. The reason is that the robot's operational state using the feedback of the detection result by the sensor may have a different movement every time the operation program PD is executed.

When there is no evaluation value exceeding the threshold value, the risky operation detector 14 determines that the risk degree is not high (NO in step ST28), and allows the processing to proceed to step ST31. On the other hand, when there is an evaluation value exceeding the threshold value, the risky operation detector 14 determines that the risk degree is high (YES in step ST28). In this case, the operation modifying unit 15 generates the modified operation program MPD by modifying the risky operational state determined to be high in the risk degree (step ST29), and allows the processing to proceed to step ST31.

In step ST29, the operation modifying unit 15 can modify the operation program PD by using, for example, a method of slowing a moving speed of the evaluation region (a hand) to cause the evaluation value to be lowered, a method of switching an operation mode of the robot 2 between joint interpolation operation and linear interpolation operation in the orthogonal coordinate system, a method of generating an intermediate point (for example, a point where temporary operation stop is performed) to cause the evaluation value to be lowered, or a method of incorporating a robot's operational state corresponding to a low evaluation value. As for the method of generating the intermediate point of operation, the user may set the intermediate point by operating a manual input device 4. Alternatively, a plurality of intermediate points is automatically generated, and an intermediate point may be selected at which the evaluation value is the lowest among the plurality of intermediate points. In addition, combinations of these methods may also be adopted.

The robot operation evaluation device 1B of the third embodiment can automatically detect a hand's operational state having a high risk degree from the operation program PD, and modify the hand's operational state to create a robot's operational state with a low risk degree. Therefore, it becomes unnecessary to modify by trial and error the operation program PD while operating an actual machine of the robot 2 in order to take a safety measure. As a result, the start-up period of the robot system can be shortened.

Fourth Embodiment

Figure 15:
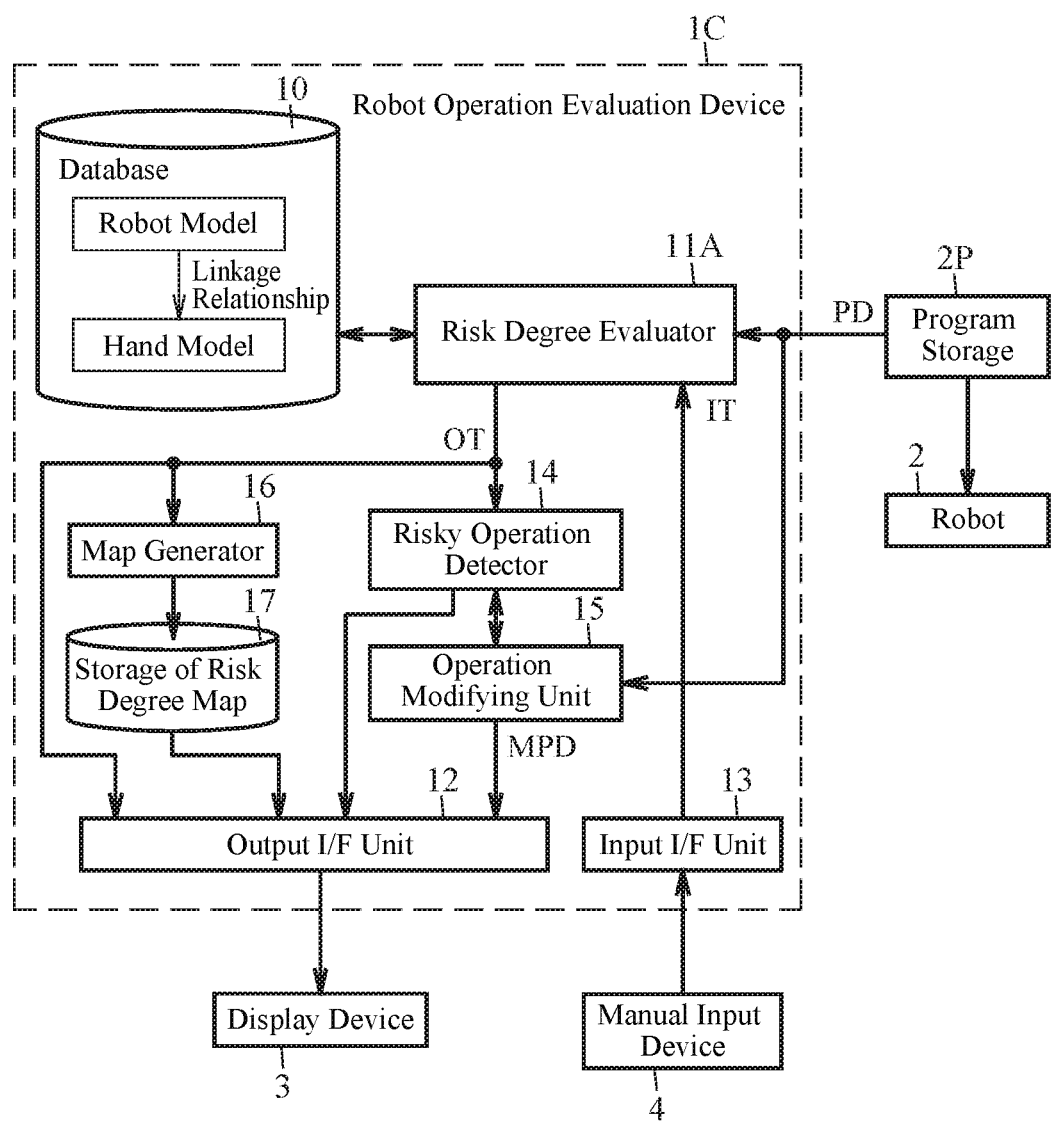
FIG. 15 is a block diagram illustrating a schematic configuration of a robot operation evaluation device of a fourth embodiment according to the present invention.

Next, a fourth embodiment according to the present invention will be described. FIG. 15 is a block diagram illustrating a schematic configuration of a robot operation evaluation device 1C of the fourth embodiment according to the present invention. As illustrated in FIG. 15, the robot operation evaluation device 1C includes a database 10, a risk degree evaluator 11A, an output I/F unit 12, an input I/F unit 13, a risky operation detector 14, and an operation modifying unit 15, similarly to the robot operation evaluation device 1B of the third embodiment, and further includes a map generator 16, and a storage 17 of risk degree maps.

Figure 16:
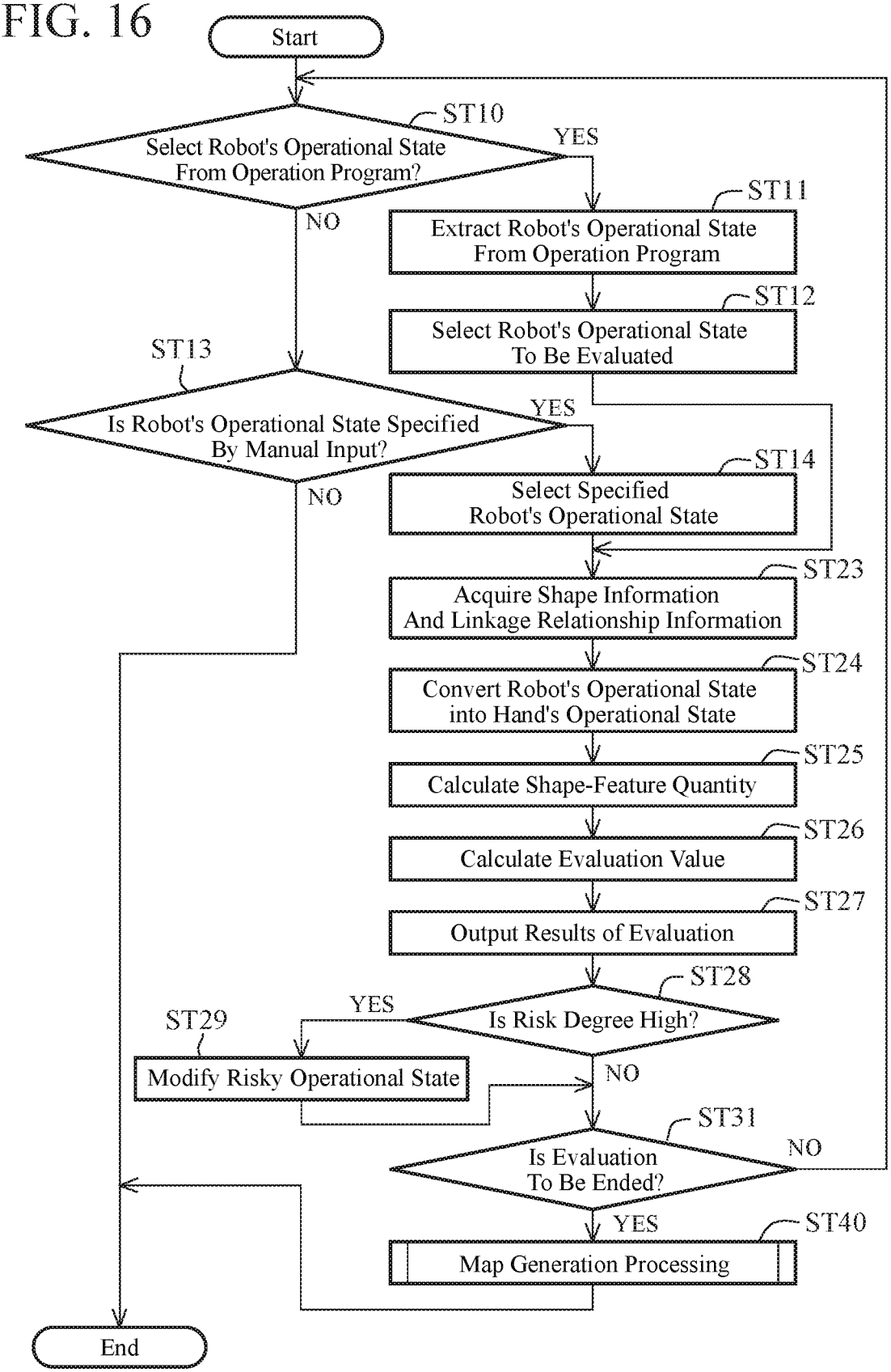
FIG. 16 is a flowchart schematically illustrating an example of a procedure of robot operation evaluation processing according to the fourth embodiment.
Figure 17:
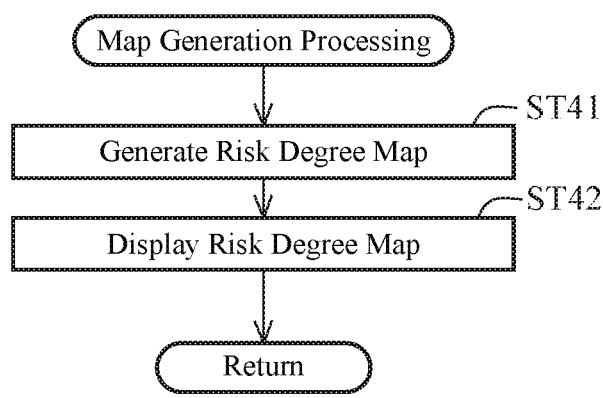
FIG. 17 is a schematic diagram illustrating an example of a procedure of map generation processing.

FIG. 16 is a flowchart schematically illustrating an example of a procedure of robot operation evaluation processing according to the fourth embodiment. The flowchart of FIG. 16 is the same as the flowchart of FIG. 14, except that map generation processing of step ST40 is executed in the case of NO in step ST31. FIG. 17 is a schematic diagram illustrating an example of a procedure of the map generation processing.

When it is determined in step ST31 that the evaluation is to be ended (YES in step ST31), in accordance with the determination, the map generator 16 generates, as a risk degree map, image information visually representing the evaluation value on the basis of the evaluation data OT (step ST41). The risk degree map is stored in the storage 17 of risk degree maps. For example, as image information to be superimposed on an image area representing the periphery of a robot's main body 2R on a simulator, the map generator 16 can generate, as a risk degree map, image information representing a three-dimensional vector or a color distribution corresponding to the evaluation value.

The output I/F unit 12 reads the risk degree map from the storage 17 of risk degree maps, superimposes the risk degree map on the image information representing the robot's main body 2R on the simulator to generate a superimposed image, and causes the display device 3 to display the superimposed image (step ST42). The output I/F unit 12 may superimpose the risk degree map on an image representing an entire image of the robot's main body 2R on the simulator as an overhead view.

Figure 18A:
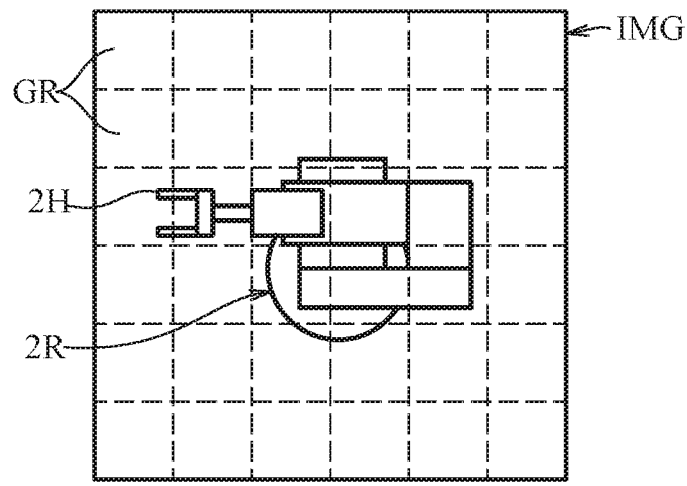
FIGS. 18A to 18C are schematic diagrams for explaining an example of a superimposed image including a risk degree map.
Figure 18B:
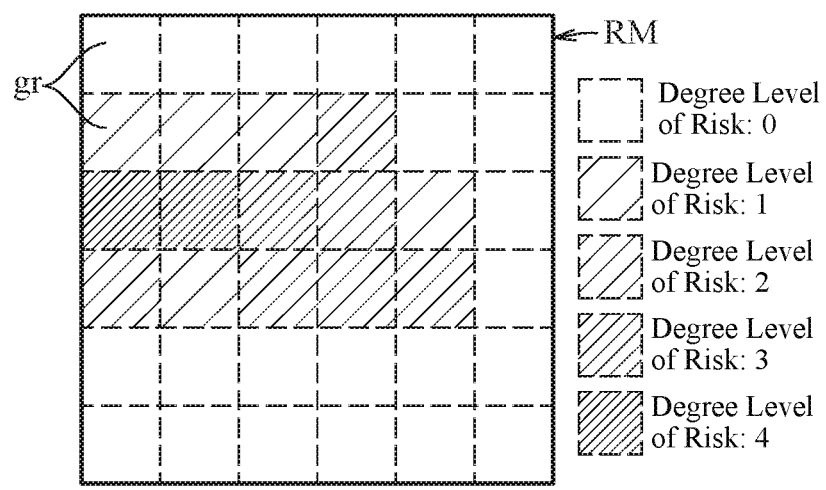
Figure 18C:
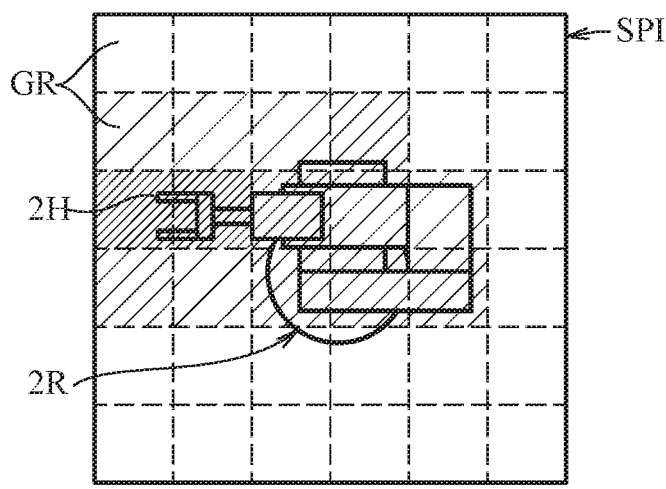

FIGS. 18A to 18C are schematic diagrams for explaining an example of the superimposed image including the risk degree map. FIG. 18A is a diagram illustrating an example of an image IMG including the entire image of the robot's main body 2R including the hand 2H, FIG. 18B is a diagram illustrating an example of a risk degree map RM corresponding to the image IMG, and FIG. 18C is a diagram illustrating an example of a superimposed image SPI. As illustrated in FIG. 18A, the image IMG is an image when a work area including the robot's main body 2R and the peripheral region thereof is viewed from just above the robot's main body 2R. This image IMG is partitioned into a grid with a plurality of grid regions GR. In this example, the map generator 16 determines a degree level of risk for each grid region GR on the basis of an evaluation value calculated for an operational state of a movable region of the robot's main body 2R including the hand 2H, and assigns a display color depending on the degree level of risk to each of the grid regions GR. Then, as illustrated in FIG. 18B, the map generator 16 generates an image including an array of grid images gr of assigned display colors, as a risk degree map RM (step ST41). Here, the grid region GR in FIG. 18A and the grid image gr in FIG. 18B correspond one-to-one. That is, a position on the image of the grid region GR and a position on the image of the corresponding grid image gr are the same. Thereafter, the output I/F unit 12 superimposes the risk degree map RM on the image IMG to generate the superimposed image SPI illustrated in FIG. 18C, and causes the display device 3 to display the superimposed image SPI (step ST42). In the example of FIG. 18B, the five degree levels of risk "0" to "4" are set. It means that the higher the density of the display color of the grid region GR, the higher the risk degree of the spatial region appearing in the grid region GR. By viewing the superimposed image SPI displayed on the display device 3, the user can intuitively and easily understand a place where the risk degree is high, a place where the risk degree is low, and a robot's operational state.

Note that, the user can know a two-dimensional risk degree distribution in the horizontal direction (the direction orthogonal to the height direction of the robot's main body 2R) from the risk degree map RM in FIG. 18B, but it is difficult to know a risk degree distribution in the height direction. Therefore, it is desirable that the user sets in advance a plurality of height positions from a base end portion (for example, the base region 30 in FIG. 2) of the robot's main body 2R, and the map generator 16 generates the risk degree map RM for each height position. Then, the output I/F unit 12 superimposes each of a plurality of risk degree maps RM respectively corresponding to the plurality of height positions on the image IMG to generate a plurality of superimposed images SPI respectively corresponding to the plurality of height positions, and may cause the display device 3 to display these superimposed images SPI (step ST42). As a result, the user can easily know the three-dimensional risk degree distribution.

Alternatively, the output I/F unit 12 may superimpose the risk degree map on an image representing a cross section or an end section of an evaluation region of the robot 2. Alternatively, the output I/F unit 12 may compress the information in the height direction to make a risk degree map as a two-dimensional image, and cause the display device 3 to display the risk degree map. When the information in the height direction is compressed, only the information with the highest evaluation value may be left in the two-dimensional image among the evaluation values of a certain point, or both the maximum value and the minimum value of the evaluation values may be left in the two-dimensional image. By using such a two-dimensional image, comparison becomes easier with a design drawing of the robot system, and the two-dimensional image can be used as a study material for design improvement. As a result, it becomes possible to reduce a burden of system design.

After the risk degree map is displayed on the display device 3 (step ST42), the robot operation evaluation processing is ended.

As described above, the robot operation evaluation device 1C of the fourth embodiment can visualize the risk degree of the peripheral region of the robot's main body 2R. As a result, the user can intuitively understand the place where the risk degree is high and the robot's operational state, so that study of the installation position of the safety fence and the entering detection sensor becomes easier. Therefore, it becomes possible to shorten a start-up period of the robot system to which a safety measure has been applied.

Fifth Embodiment

Figure 19:
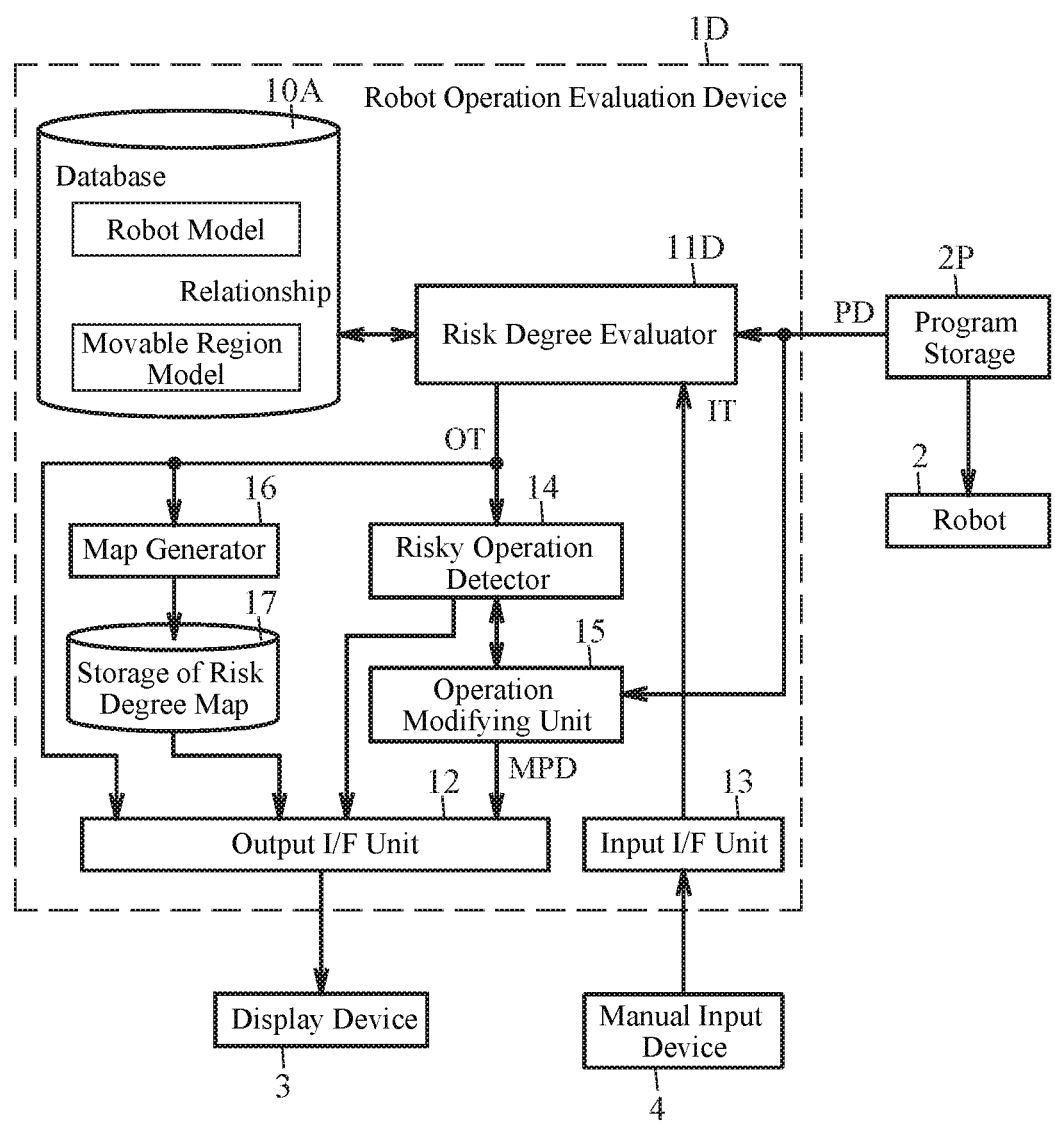
FIG. 19 is a block diagram illustrating a schematic configuration of a robot operation evaluation device of a fifth embodiment according to the present invention.

Next, the fifth embodiment according to the present invention will be described. FIG. 19 is a block diagram illustrating a schematic configuration of a robot operation evaluation device 1D of the fifth embodiment according to the present invention. As illustrated in FIG. 19, the robot operation evaluation device 1D includes an output I/F unit 12, an input I/F unit 13, a risky operation detector 14, an operation modifying unit 15, a map generator 16, and a storage 17 of risk degree maps, similarly to the robot operation evaluation device 1C of the fourth embodiment. In addition, the robot operation evaluation device 1D includes a database 10A and a risk degree evaluator 11D.

The database 10A stores in advance the robot mode described above, a movable region model modeling a movable region (hand and joint) of the robot 2, and linkage relationship information indicating a linkage relationship between the robot model and the movable region model. Here, when storing the movable region model in the database 10A, it is desirable to store not only shape data of the joint of the robot 2, but also shape data of a jig attached thereto. As a result, it possible to evaluate the risk degree even when the jig is installed in the joint of the robot 2.

Figure 20:
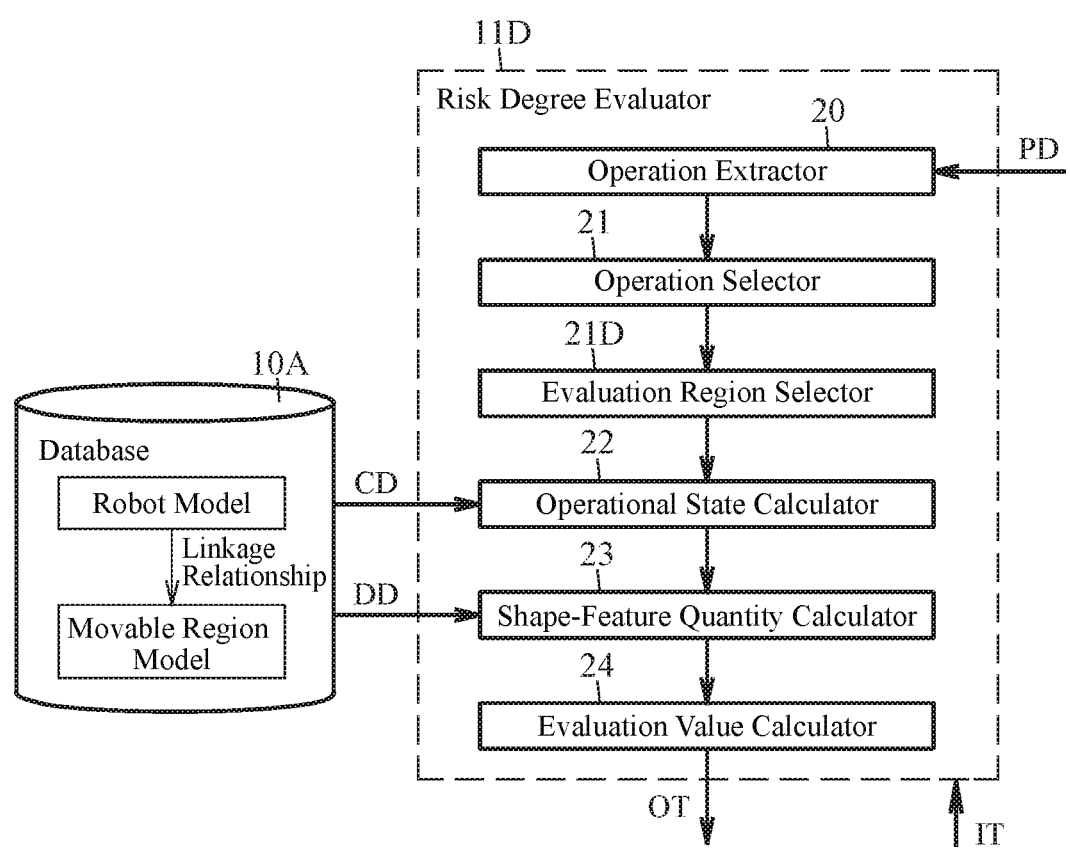
FIG. 20 is a block diagram illustrating a schematic configuration of a risk degree evaluator of the fifth embodiment.

FIG. 20 is a block diagram illustrating a schematic configuration of the risk degree evaluator 11D of the fifth embodiment. The configuration of the risk degree evaluator 11D is the same as the configuration of the risk degree evaluator 11A of the second embodiment, except that an evaluation region selector 21D is included between the operation selector 21 and the operational state calculator 22.

Figure 21:
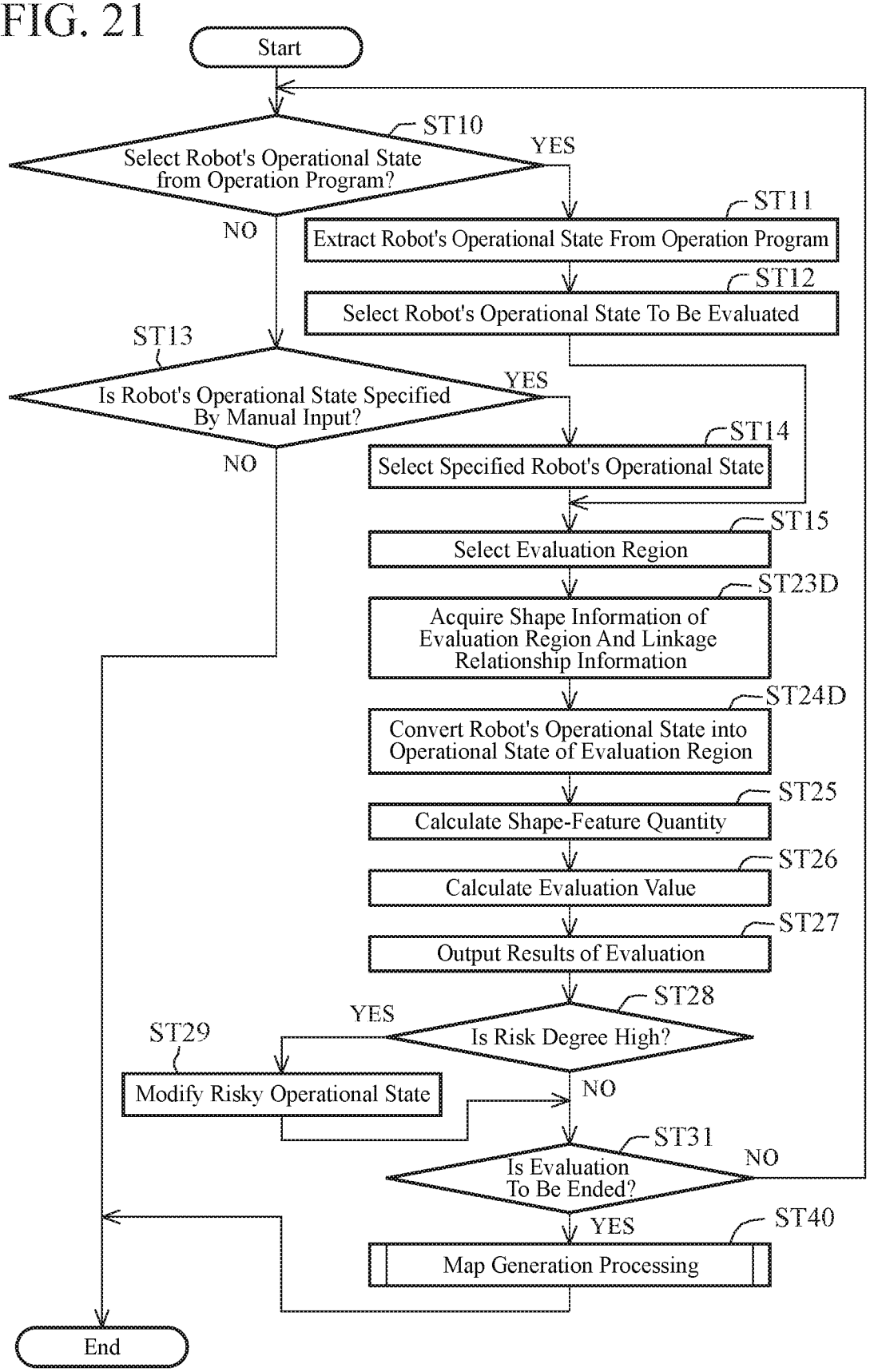
FIG. 21 is a flowchart illustrating an example of a procedure of robot operation evaluation processing according to the fifth embodiment.

FIG. 21 is a flowchart illustrating an example of a procedure of robot operation evaluation processing according to the fifth embodiment. The flowchart of FIG. 21 is the same as the flowchart of FIG. 16 except that steps ST15, ST23D, and ST24D are included between steps ST14 and ST25.

After execution of step ST14 or step ST12, the evaluation region selector 21D selects a movable region of the robot corresponding to a robot's operational state selected in step ST14 or ST15, as an evaluation region (step ST15). Here, as the evaluation region, not only the hand but also the joint of the robot 2 can be selected. Thereafter, the operational state calculator 22 and the shape-feature quantity calculator 23 respectively acquire linkage relationship information CD and shape information DD indicating the shape of the movable region model from the database 10 (step ST23D). Thereafter, the operational state calculator 22 converts the robot's operational state into an operational state of the evaluation region by using the linkage relationship information CD (step ST24D). Next, the shape-feature quantity calculator 23 calculates a shape-feature quantity indicative of a feature of the shape of the evaluation region with respect to an operation direction of the evaluation region corresponding to the robot's operational state, by using the shape information DD (step ST25). The method of calculating the shape-feature quantity is as described above. Processing after that from step ST26 is as described above.

As described above, not limited to the robot hand, the robot operation evaluation device 1D of the fifth embodiment can also evaluate the risk degree of collision by each joint of the robot 2. Therefore, it is possible to evaluate the risk degree of the entire robot.

Sixth Embodiment

Figure 22:
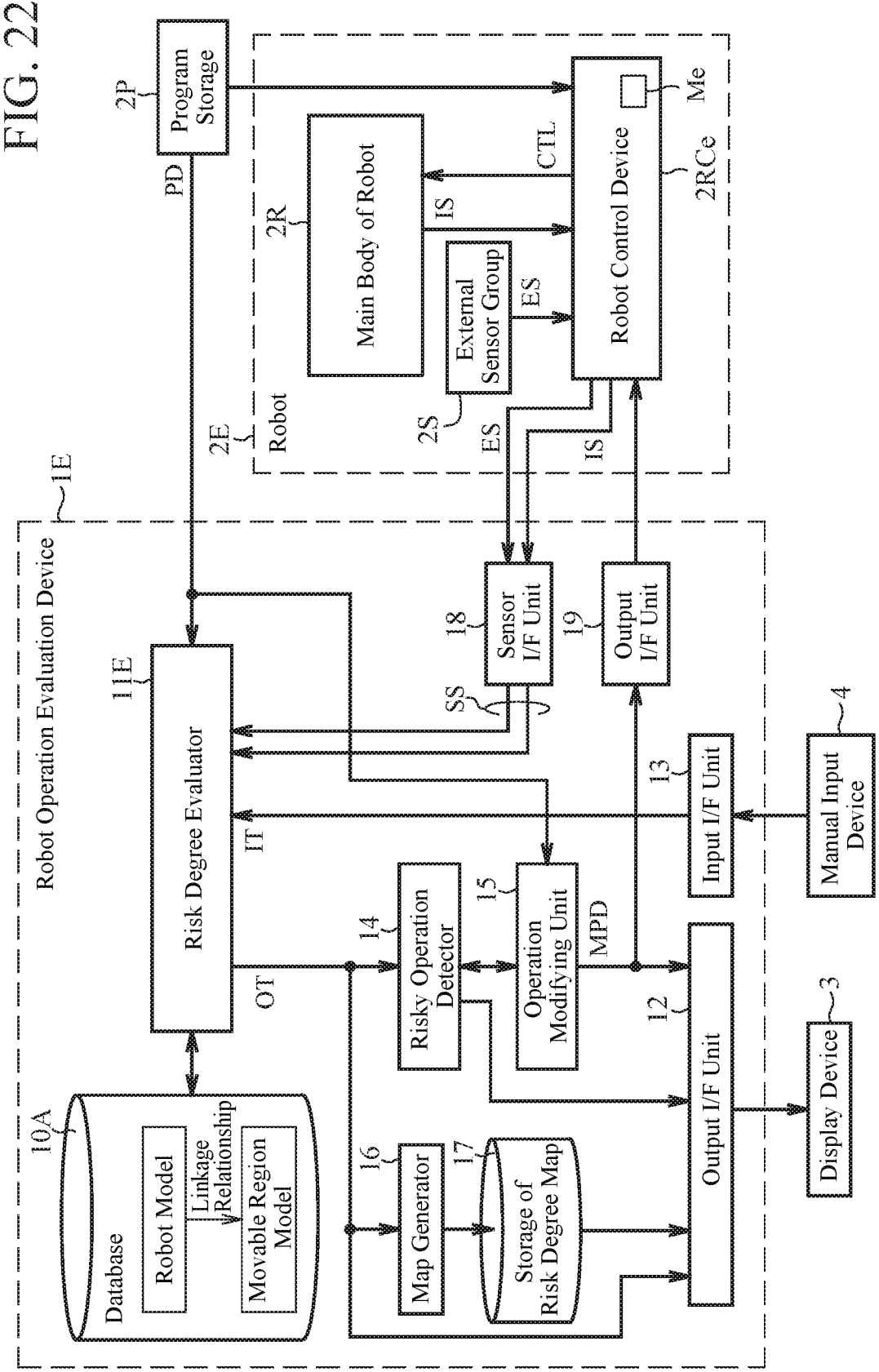
FIG. 22 is a block diagram illustrating a schematic configuration of a robot system including a robot operation evaluation device of a sixth embodiment according to the present invention.

Next, a sixth embodiment according to the present invention will be described. FIG. 22 is a functional block diagram illustrating a schematic configuration of a robot system including a robot operation evaluation device 1E of the sixth embodiment according to the present invention. As illustrated in FIG. 22, the robot system includes a robot operation evaluation device 1E, a robot 2E, and a program storage 2P for supplying an operation program to the robot 2E. The robot 2E includes a robot's main body (manipulator) 2R, a robot control device 2RCe for controlling operation of the robot's main body 2R in accordance with the operation program acquired from the program storage 2P, and an external sensor group 2S. A configuration of the robot 2E is the same as the configuration of the robot 2 except that the robot control device 2RCe of FIG. 22 is included instead of the robot control device 2RC of the first embodiment.

Similarly to the robot control device 2RC (FIG. 2) of the first embodiment, the robot control device 2RCe generates a control signal group CTL in accordance with a sequence of operation commands described in an operation program in an internal memory Me. The robot control device 2RCe has a function of executing feedback control or feedforward control on the robot's main body 2R by using a state detection signal IS indicating an internal state of the robot's main body 2R, and has a function of controlling operation of the robot's main body 2R by using a state detection signal ES indicating an external state of the robot's main body 2R.

The robot control device 2RCe of the present embodiment further supplies the state detection signals IS and ES to the robot operation evaluation device 1E. The robot operation evaluation device 1E can evaluate a risk degree of an operational state of an evaluation region by using the state detection signals IS and ES supplied from the robot control device 2RCe. Here, the robot control device 2RCe may output the state detection signals IS and ES to the robot operation evaluation device 1E only when the state detection signals IS and ES indicate detection values within a numerical range specified in advance.

Alternatively, the robot control device 2RCe may supply a substitute signal corresponding to the state detection signals IS and ES to the robot operation evaluation device 1E when the state detection signals IS and ES indicate detection values within a numerical range specified in advance. In order to supply such a substitute signal, the robot control device 2RCe can include an input/output unit (I/O unit). For example, when the external sensor group 2S includes a pressure sensor, when a pressure detection value by the pressure sensor does not reach a threshold value specified in advance, the I/O unit can output a binary signal indicating a value of "0" as a substitute signal to the robot operation evaluation device 1E, and when the pressure detection value reaches the threshold value, the I/O unit can output a binary signal indicating a value of "1" as a substitute signal to the robot operation evaluation device 1E. In addition, when the external sensor group 2S includes a distance measuring sensor, when a distance measurement value satisfies a condition specified in advance (for example, it is within a specific numerical range), the I/O unit can output a binary signal indicating a value of "1" (ON signal) as a substitute signal to the robot operation evaluation device 1E, and when the distance measurement value does not satisfy the condition, the I/O unit can output a binary signal indicating a value of "0" (OFF signal) as a substitute signal to the robot operation evaluation device 1E.

As illustrated in FIG. 22, the robot operation evaluation device 1E according to the present embodiment includes a risk degree evaluator 11E for evaluating the risk degree of the operational state of the evaluation region by using a database 10A, a sensor interface unit (sensor I/F unit) 18 for receiving the state detection signals IS and ES from the robot 2E, and an output interface unit (output I/F unit) 19 for transmitting a modified operation program MPD generated by an operation modifying unit 15 to the robot 2E. A configuration of the robot operation evaluation device 1E is the same as the configuration the robot operation evaluation device 1D of the fifth embodiment except that the risk degree evaluator 11E of FIG. 22 is included instead of the risk degree evaluator 11D of the fifth embodiment, and the sensor I/F unit 18 and the output I/F unit 19 are included.

Upon receiving the state detection signals IS and ES from the robot 2E, the sensor I/F unit 18 outputs a reception signal SS indicating the state detection signals IS and ES to the risk degree evaluator 11E. As described above, when the robot control device 2RCe supplies the substitute signal corresponding to the state detection signals IS and ES to the sensor I/F unit 18, the sensor I/F unit 18 may output the reception signal SS indicating the substitute signal to the risk degree evaluator 11E. On the other hand, upon receiving the modified operation program MPD fed back from the output I/F unit 19 of the robot operation evaluation device 1E, the robot control device 2RCe uses the modified operation program MPD instead of the operation program in the internal memory Me and generates the control signal group CTL in accordance with the operation command described in the modified program MPD.

Figure 23:
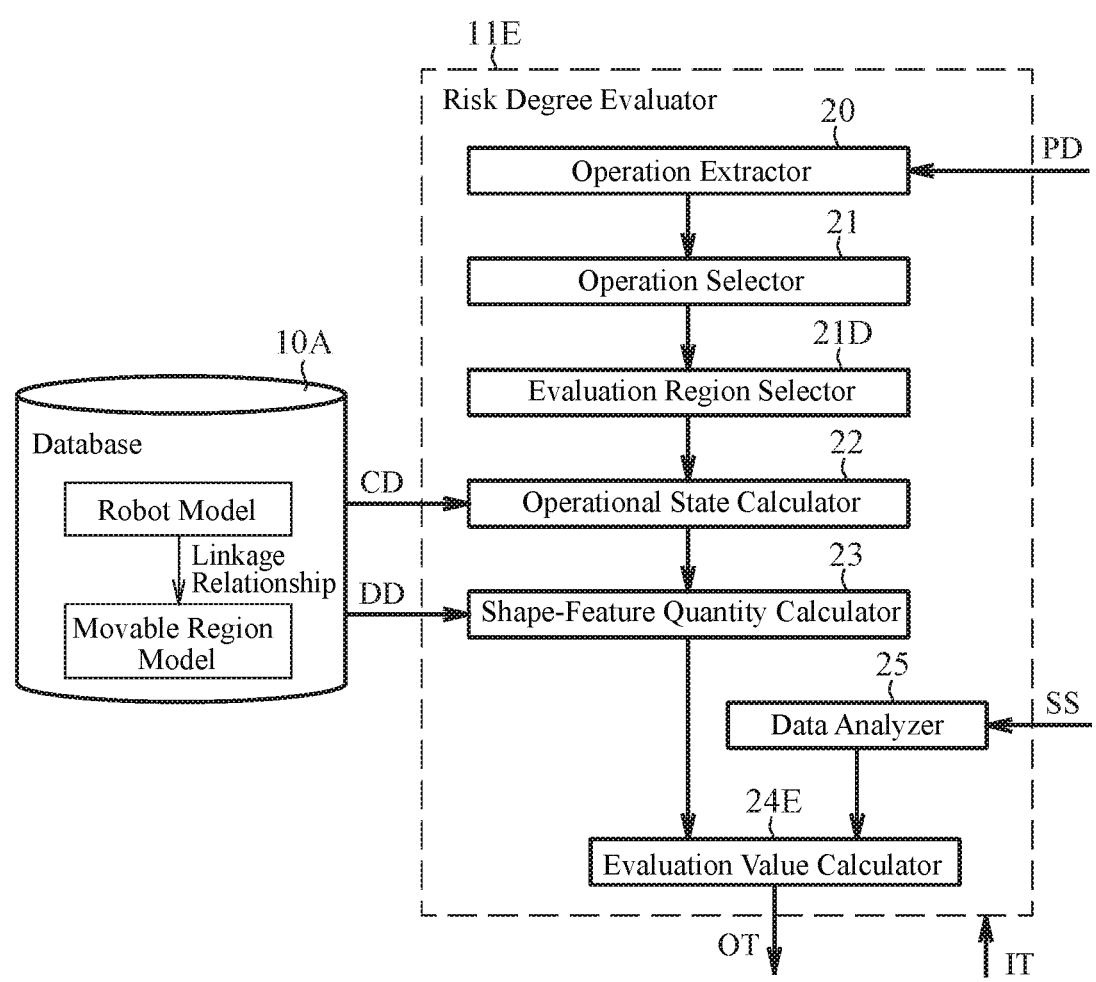
FIG. 23 is a block diagram illustrating a schematic configuration of a risk degree evaluator of the sixth embodiment.

FIG. 23 is a block diagram illustrating a schematic configuration of the risk degree evaluator 11E of the sixth embodiment. The risk degree evaluator 11E of the present embodiment includes an operation extractor 20, an operation selector 21, an evaluation region selector 21D, an operational state calculator 22, and a shape-feature quantity calculator 23, similarly to the risk degree evaluator 11D of the fifth embodiment. The risk degree evaluator 11E of the present embodiment includes a data analyzer 25 for analyzing the input reception signal SS and outputs the analysis result to an evaluation value calculator 24E, and the evaluation value calculator 24E for calculating two types of evaluation values (first evaluation value and second evaluation value) representing risk degrees of the evaluation region on the basis of the analysis result and a shape-feature quantity calculated by the shape-feature quantity calculator 23.

Figure 24:
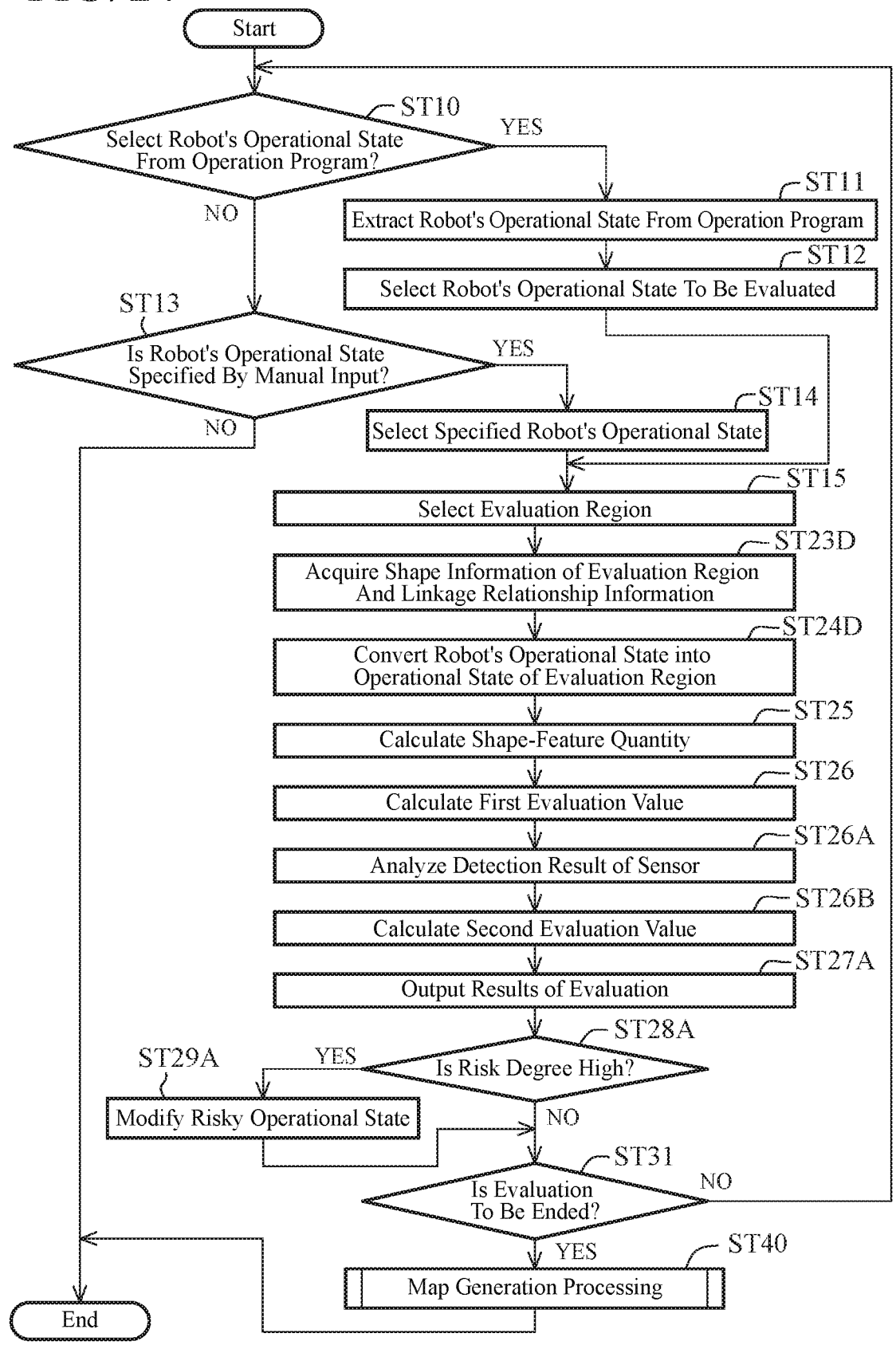
FIG. 24 is a flowchart schematically illustrating an example of a procedure of robot operation evaluation processing according to the sixth embodiment.

Hereinafter, operation of the robot operation evaluation device 1E will be described with reference to FIG. 24. FIG. 24 is a flowchart schematically illustrating an example of a procedure of robot operation evaluation processing according to the sixth embodiment.

Referring to FIG. 24, similarly to the procedure (FIG. 21) of the robot operation evaluation processing according to the fifth embodiment, steps ST10 to ST15, ST23D, ST24D, ST25, and ST26 are executed. In step ST26, as described above, the evaluation value calculator 24 calculates, as the first evaluation value, the evaluation value representing the risk degree of the operational state of the evaluation region with respect to the operation direction of the evaluation region, on the basis of the shape-feature quantity calculated in step ST25, or on the basis of both the shape-feature quantity and a moving speed of the evaluation region.

In step ST26A, the data analyzer 25 analyzes the input reception signal SS and outputs the analysis result to the evaluation value calculator 24E (step ST26A). Specifically, when the external sensor group 2S includes an imaging device and a distance measuring sensor, the data analyzer 25 can recognize each region (for example, a body region of a human such as a head, a forearm region, a hand or leg region) of an object such as a human existing in a peripheral region of the robot's main body 2R by analyzing imaging data and a distance measurement value, and calculate a current position of each region of the object and a speed of each region of the object. Further, the data analyzer 25 can predict a future position and a speed of each region of the object, and calculate a probability that each region of the object exists at the predicted position. Alternatively, when the external sensor group 2S includes a temperature sensor capable of measuring a temperature distribution in the peripheral region of the robot's main body 2R, the data analyzer 25 can also detect a spatial region dangerous for an object such as a human in the peripheral region by analyzing temperature data indicating the temperature distribution.

Next, on the basis of the analysis result obtained from the data analyzer 25, the evaluation value calculator 24E calculates the second evaluation value representing the risk degree of the operational state of the evaluation region with respect to the operation direction of the evaluation region (step ST26B). For example, on the basis of the analysis result, the evaluation value calculator 24E can calculate a probability P of collision of the evaluation region in the future with an object such as a human existing in the peripheral region of the robot's main body 2R and magnitude $F_c$ of a physical shock at the time of the collision, and calculate the second evaluation value on the basis of the calculation result. For example, the second evaluation value can be calculated as the product of the probability $P_c$ and the magnitude $F_c$ of the physical shock (=$P_c \times F_c$).

Here, if the data analyzer 25 identifies that the object approaching the robot's main body 2R is a human, the evaluation value calculator 24E may determine which of the body regions of the human has a possibility of collision with the robot's main body 2R depending on the robot's operational state, and evaluate the magnitude $F_c$ of the physical shock at the time of the collision on the basis of the determination result. The evaluation value calculator 24E can set the magnitude $F_c$ of the physical shock to a relatively large value if the body region with a possibility of collision with the robot's main body 2R is the human head, and set the magnitude $F_c$ of the physical shock to a relatively small value if the body region with a possibility of collision with the robot's main body 2R is the human forearm region. As a specific value of the magnitude $F_c$ of the physical shock, a value prepared in advance by various methods (for example, an impulse value) may be used. For example, a value empirically determined on the basis of past accident cases may be used as a specific value of the magnitude $F_c$.

In addition, the evaluation value calculator 24E does not have to calculate the second evaluation value using the same calculation formula in all cases. For example, the evaluation value calculator 24E determines whether or not the magnitude $F_c$ of the physical shock at the time of the collision is greater than or equal to a certain value, and if it is determined that the magnitude $F_c$ is greater than or equal to the certain value, the probability $P_c$ may be set to 100%. Alternatively, when the object recognized by the data analyzer 25 is an object scheduled to come into contact with the evaluation region (for example, a work object scheduled to be grasped by the robot hand), the evaluation value calculator 24E may set the second evaluation value representing the risk degree to zero.

After steps ST26, ST26A, and ST26B, the evaluation value calculator 24E outputs evaluation data OT indicating the evaluation value to the output I/F unit 12 and the risky operation detector 14 (step ST27A). On the basis of the first evaluation value or the second evaluation value indicated by the evaluation data OT, the risky operation detector 14 determines whether or not the risk degree is high (step ST28A). For example, when only the first evaluation value exceeds a first threshold value prepared in advance, when only the second evaluation value exceeds a second threshold value prepared in advance, or when the first evaluation value exceeds the first threshold value and the second evaluation value exceeds the second threshold value, the risky operation detector 14 can determine that the risk degree is high.

When it is determined that the risk degree is high (YES in step ST28A), the risky operation detector 14 causes the processing to proceed to step ST29A. In this case, the operation modifying unit 15 generates the modified operation program MPD by modifying a risky operational state determined to be high in risk degree (step ST29), and causes the processing to proceed to step ST31. For example, when it is determined that the risk degree is high because there is a high possibility that the evaluation region of the robot's main body 2R comes into contact with a human body region, the risky operation detector 14 can generate the modified operation program MPD by changing at least one of the moving speed of the evaluation region and a planned movement position (planned trajectory) of the evaluation region, in the operation program PD, or incorporating an operation command to stop the operation of the robot's main body 2R. The modified operation program MPD is output to the output I/F unit 12 and the output I/F unit 19. On the other hand, if it is determined that the risk degree is not high (NO in step ST28A), the risky operation detector 14 causes the processing to proceed to step ST31.

Thereafter, in the case where the evaluation is not to be ended (NO in step ST31), the risk degree evaluator 11E executes step ST10. On the other hand, in the case where it is determined that the evaluation is to be ended (YES in step ST31), in accordance with the determination, the map generator 16 generates, as a risk degree map, image information visually representing the evaluation value on the basis of the evaluation data OT (step ST41). The risk degree map is stored in the storage 17 of risk degree maps. As described above, the output I/F unit 12 reads the risk degree map from the storage 17 of risk degree maps, superimposes the risk degree map on the image information representing the robot's main body 2R on the simulator, and causes the display device 3 to display the superimposed image (step ST42). This concludes the robot operation evaluation processing.

As described above, in the robot operation evaluation device 1E of the sixth embodiment, the data analyzer 25 analyzes the state detection signals IS and ES or the substitute signal corresponding to the state detection signals IS and ES. On the basis of the analysis result, the evaluation value calculator 24E calculates the second evaluation value representing the risk degree of the operational state of the evaluation region. On the basis of the second evaluation value, the risky operation detector 14 can determine whether or not the risk degree of the operational state of the evaluation region is high. When it is determined that the risk degree is high, the operation modifying unit 15 changes the operational state of the evaluation region defined in the operation program PD, and generates the modified operation program MPD defining the changed operational state. The robot control device 2RCe can use the modified operation program MPD fed back, instead of the operation program in the internal memory Me, and generate the control signal group CTL in accordance with the operation command described in the modified program MPD. Therefore, in the robot system of the present embodiment, the actual operational state of the robot's main body 2R can be changed in real time so as to reduce the risk degree, based on the state detection signals IS and ES. For this reason, a robot system with high safety can be constructed.

Although the various embodiments according to the present invention have been described with reference to the drawings, these embodiments are examples of the present invention, and various forms other than these embodiments can be adopted. For example, similarly to the robot operation evaluation device 1 of the first embodiment, the hardware configuration of each of the robot operation evaluation devices 1A to 1E of the second to sixth embodiments can be implemented by, for example, an information processing device having a computer configuration incorporating a CPU. Alternatively, the hardware configuration of each of the robot operation evaluation devices 1A to 1E may be implemented by an information processing device including an LSI such as a DSP, an ASIC, or an FPGA. In addition, similarly to the robot operation evaluation device 1 of the first embodiment, the hardware configuration of each of the robot operation evaluation devices 1A to 1E of the second to sixth embodiments can be implemented by either the information processing device 1H illustrated in FIG. 8 or the information processing device 1J illustrated in FIG. 9.

Note that, within the scope of the present invention, free combination of the first to sixth embodiments, a modification of an arbitrary component of each embodiment, or omission of an arbitrary component in each embodiment is possible.

INDUSTRIAL APPLICABILITY

In accordance with the present invention, because the robot operation evaluation device is suitable for being used for a robot including one or more movable regions, such as a robot including a single joint structure or an articulated structure, the robot operation evaluation device can be applied not only to industrial robots used in industrial fields such as a manufacturing industry and a construction industry, but also to non-industrial robots such as service robots used in public facilities and homes. A robot system including such a robot operation evaluation device also can be used not only in industrial fields but also in non-industrial fields.

REFERENCE SIGNS LIST 1, 1A, 1B, 1C, 1D, 1E: Robot operation evaluation devices; 2, 2E: Robots; 2R: Robot's main body; 2S: External sensor group; 2RC, 2RCe: Robot control devices; 2H, 2Ha: Robot hands; 2a, 2b: Claw portions; 2m: Body portion; 2n: Base end portion; 2c: Suction pad portion; 2P: Program storage; 3: Display device; 4: Manual input device; 10, 10A: Databases; 11, 11A, 11D, 11E: Risk degree evaluators; 12: Output interface unit (output I/F unit); 13: Input interface unit (input I/F unit); 14: Risky operation detector; 15: Operation modifying unit; 16: Map generator; 17: Storage of risk degree maps; 18: Sensor interface unit (sensor I/F unit); 19: Output interface unit (output I/F unit); 20: Operation extractor; 21: Operation selector; 21D: Evaluation region selector; 22: Operational state calculator; 23: Shape-feature quantity calculator; 24, 24E: Evaluation value calculators; 25: Data analyzer; 30: Base region; 31 to 34: First to fourth arm regions (robot arm); 34a: Flange portion; and Φ1 to Φ6: Rotation axes.

The invention claimed is:

1. A robot operation evaluation device comprising:
an operational state calculator to calculate an operational state of movement of an evaluation region that is a movable region of a robot, based on an operational state of the robot;
a shape-feature quantity calculator to calculate one or more shape-feature quantities indicative of a feature of a shape of the evaluation region from a viewpoint of an operation direction of movement of the evaluation region, the operation direction of movement of the evaluation region corresponding to the calculated operational state of movement of the evaluation region; and
an evaluation value calculator to calculate an evaluation value representing a risk degree of the operational state of movement of the evaluation region from the viewpoint of the operation direction of movement of the evaluation region, based on the calculated one or more shape-feature quantities.

2. The robot operation evaluation device according to claim 1, wherein the shape-feature quantity calculator calculates an area of the evaluation region in an end section or cross section perpendicular to the operation direction of movement of the evaluation region, as at least one of the one or more shape-feature quantities.

3. The robot operation evaluation device according to claim 1, wherein:
the shape-feature quantity calculator calculates, as the one or more shape-feature quantities, a plurality of areas of the evaluation region in a plurality of faces, each said face including an end section or cross section perpendicular to the operation direction of movement of the evaluation region; and
the faces are respectively located at different positions in the operation direction of movement of the evaluation region.

4. The robot operation evaluation device according to claim 3, wherein the evaluation value calculator calculates the evaluation value based on a smallest area among the plurality of areas of the evaluation region.

5. The robot operation evaluation device according to claim 3, wherein:
the evaluation value calculator respectively weights the areas of the evaluation region with weighting coefficients and calculates the evaluation value based on a summation of the weighted areas of the evaluation region; and
values of the weighting coefficients for assignment to the respective areas of the evaluation region increase as located positions of face regions having the respective areas become more positive in the operation direction of movement of the evaluation region.

6. The robot operation evaluation device according to claim 1, wherein the shape-feature quantity calculator projects a shape of the evaluation region onto a projection face virtually arranged on a more positive side in the operation direction of movement from the evaluation region, and calculates at least one of the one or more shape-feature quantities based on a ridgeline or vertex appearing in the projected shape.

7. The robot operation evaluation device according to claim 6, wherein the shape-feature quantity calculator calculates, as said at least one shape-feature quantity of the one or more shape-feature quantities, an angle formed between two faces forming the ridgeline, or an angle formed between two faces among a plurality of faces forming the vertex.

8. The robot operation evaluation device according to claim 1, wherein:
the operational state calculator calculates the operation direction of movement of the evaluation region by using linkage relationship information defining a linkage relationship between a robot model modeling the robot and a movable region model modeling the movable region of the robot; and
the shape-feature quantity calculator calculates each of the one or more shape-feature quantities based on shape information indicating a shape of the movable region model.

9. The robot operation evaluation device according to claim 1, wherein the evaluation value calculator calculates the evaluation value based on the calculated one or more shape-feature quantities and a moving speed of the evaluation region.

10. The robot operation evaluation device according to claim 1, further comprising an operation selector to receive actual operation data indicating actual operation of the robot, and to select the operational state of the robot based on the actual operation data, wherein the operational state calculator calculates the operational state of movement of the evaluation region based on the operational state of the robot selected by the operation selector.

11. The robot operation evaluation device according to claim 1, further comprising:
an operation extractor to receive an operation program defining a sequence of operations of the robot, and to extract a plurality of operational states of the robot from the operation program, including said operational state of the robot based on which the operational state of movement of the evaluation region is calculated by the operational state calculator; and
an operation selector to receive a selected operational state of the robot from among the extracted plurality of operational states,
wherein the operational state calculator calculates said operational state of movement of the evaluation region based on the selected operational state operational state of the robot received by the operation selector.

12. The robot operation evaluation device according to claim 11, further comprising a risky operation detector to determine whether the evaluation value calculated by the evaluation value calculator exceeds a threshold value.

13. The robot operation evaluation device according to claim 12, further comprising an operation modifier to modify the operational state of movement of the evaluation region when the risky operation detector determines that the evaluation value exceeds the threshold value, to thereby cause the evaluation value to become smaller.

14. The robot operation evaluation device according to claim 11, further comprising:
a map generator to generate image information visually representing the evaluation value as a risk degree map; and
an output interface to control a display device to display the risk degree map.

15. The robot operation evaluation device according to claim 11, further comprising an evaluation region selector to select said movable region from among a plurality of movable regions of the robot, as the evaluation region.

16. The robot operation evaluation device according to claim 1, wherein the evaluation region includes a robot hand.

17. The robot operation evaluation device according to claim 13, further comprising:
a sensor interface to receive a state detection signal or a substitute signal corresponding to the state detection signal, the state detection signal being output from at least one sensor that detects a state of at least one of an internal state of the robot and an external state of the robot; and
a data analyzer to analyze the state detection signal or the substitute signal and to output an analysis result, wherein:
the evaluation value calculator calculates another evaluation value representing a another risk degree of the operational state of movement of the evaluation region from the viewpoint of the operation direction of movement of the evaluation region based on the analysis result,
the risky operation detector determines whether or not said another risk degree from the viewpoint of the operational state of movement of the evaluation region is high based on said another evaluation value, and
the operation modifier modifies the operational state of movement of the evaluation region determined as having a high risk degree by the risky operation detector, to thereby cause said another evaluation value to become smaller.

18. A robot system comprising:
the robot operation evaluation device according to claim 17;
a main body of the robot configured to operate in accordance with an operation command; and
a robot control device configured to supply the operation command to the main body of the robot,
wherein the robot control device generates the operation command based on a modified operational state of the evaluation region modified by the operation modifier of the robot operation evaluation device.

19. A robot operation evaluating method to be executed in an information processing device, the robot operation evaluating method comprising:

calculating an operational state of movement of an evaluation region that is a movable region of a robot based on an operational state of the robot;

calculating one or more shape-feature quantities indicative a feature of a shape of the evaluation region as viewed from an operation direction of movement of the evaluation region, the operation direction of movement of the evaluation region corresponding to the calculated operational state of movement of the evaluation region; and calculating an evaluation value representing a risk degree of the operational state of movement of the evaluation region as viewed from the operation direction of movement of the evaluation region based on the calculated one or more shape-feature quantities.

20. A robot operation evaluation system comprising:

control circuitry configured to, when an evaluation region that is a movable region of a robot is detected to come in contact with an object,
determine an operational state of movement of the evaluation region based on an operational state of the robot,
determine one or more shape-feature quantities indicative of a feature of a shape of the evaluation region with respect to a moving direction of the evaluation region as the evaluation region moves in the moving direction, the moving direction of the evaluation region corresponding to the calculated operational state of the evaluation region,
determine an evaluation value representing a risk degree of the operational state of movement of the evaluation region with respect to the moving direction of the evaluation region, as the evaluation region moves in the moving direction, based on the calculated one or more shape-feature quantities, and
control the operational state of movement of the evaluation region based on analysis of the calculated evaluation value representing the risk degree of the operational state of the evaluation region with respect to the moving direction of the evaluation region.

* * * * *